(12) United States Patent
Henderson et al.

(10) Patent No.: US 7,666,381 B2
(45) Date of Patent: Feb. 23, 2010

(54) CONTINUOUS PRODUCTION OF CARBON NANOMATERIALS USING A HIGH TEMPERATURE INDUCTIVELY COUPLED PLASMA

(75) Inventors: Mark Henderson, Pasco, WA (US);
John Vavruska, Santa Fe, NM (US);
Andreas Blutke, Richland, WA (US);
Robert Ferguson, Richland, WA (US)

(73) Assignee: Plasmet Corporation, Walla Walla, WA (US)

( * ) Notice: Subject to any disclaimer, the term of this patent is extended or adjusted under 35 U.S.C. 154(b) by 1076 days.

(21) Appl. No.: 10/865,677

(22) Filed: Jun. 10, 2004

(65) Prior Publication Data

US 2009/0099004 A1    Apr. 16, 2009

Related U.S. Application Data

(60) Provisional application No. 60/477,710, filed on Jun. 10, 2003.

(51) Int. Cl.
*D01F 9/12* (2006.01)
*B82B 3/00* (2006.01)

(52) U.S. Cl. .............................. 423/447.1; 423/445 B; 977/844

(58) Field of Classification Search ............. 423/445 B, 423/447.1; 977/844
See application file for complete search history.

(56) References Cited

U.S. PATENT DOCUMENTS

| | | | |
|---|---|---|---|
| 4,663,230 A | 5/1987 | Tennent | 428/367 |
| 4,990,740 A | 2/1991 | Meyer | 219/121.52 |
| 5,578,543 A | 11/1996 | Tennent et al. | 502/180 |
| 5,611,947 A | 3/1997 | Vavruska | 219/121.52 |
| 5,707,916 A | 1/1998 | Snyder et al. | 502/180 |
| 5,876,684 A | 3/1999 | Withers et al. | 423/445 B |
| 6,153,852 A | 11/2000 | Blutke et al. | 219/121.59 |
| 6,331,209 B1 | 12/2001 | Jang et al. | 117/90 |
| 6,333,016 B1 | 12/2001 | Resasco et al. | 423/447.3 |
| 6,444,864 B1 | 9/2002 | Knight et al. | 585/241 |
| 6,759,025 B2 * | 7/2004 | Hong et al. | 423/447.3 |
| 6,855,301 B1 * | 2/2005 | Rich et al. | 423/1 |

OTHER PUBLICATIONS

Delzeit et al., 'Growth of Multiwall Carbon Nanotubes in Inductively Coupled Plasma Reactor' in J. Appl. Phys. vol. 91 #9 pp. 6027-6033, May 1, 2002.*

Bronikowski, Michael J.; Willis, Peter A.; Colbert, Daniel T.; Smith, K.A.; and Smalley, Richard E. "Gas-phase production of carbon single-walled nanotubes from carbon monoxide via the HiPco process: A parametric study." *J. Vac. Sci. Technol. A* 19(4), Jul./Aug. 2001, pp. 1800-1805.

Thess, A.; Lee, R.; Nikolaev, P.; Dai H.; Petit, P.; Robert, J.; Xu, C.; Lee, Y.H.; Kim, S.G.; Rinzler, A.G.; Colbert, D.T.; Scuseria, G.E.; Tomanek, D.; Fischer, J.E.; and Smalley, R.E. "Crystalline Ropes of Metallic Carbon Nanotubes," *Science* Jul. 26, 1996; 273(5274):483-7. (Abstract, 1pg.).

Odom, Teri Wang; Huang, Jin-Lin; Kim, Philip; and Lieber, Charles M. "Atomic structure and electronic properties of single-walled carbon nanotubes." *Nature.* 391, 62-64 (Jan. 1, 1998); doi:10.1038/34145. © Macmillan Publishers Ltd. 1998 Registered No. 785998 England. 1 pg.

Qin, L.C.; Zhou, D.; Krauss, A.R.; and Gruen, D.M. "Growing carbon nanotubes by microwave plasma-enhanced chemical vapor deposition." *Applied Physics Letters*, vol. 72, No. 26, Jun. 29, 1998, pp. 3437-3439.

Smiljanic, O.; Larouche, F.; Stansfield, B.L.; Dodelet, J.P., and Sun, X. "Gas phase synthesis of SWNT by a continuous and scalable plasma based process." Abstract submitted to the Nanotube'02 Workshop. Last modified Jun. 21, 2002. Available http://dielc/kaist.ac.kr/nt02/abstracts/P109.shtml. 1 pg.

Zheng, B.; Li, Y.; and Liu, J. "CVD synthesis and purification of single-walled carbon nanotubes on aerogel-supported catalyst." *Applied Physics A*, 74, 345-348 (2002). pp. 345-348.

* cited by examiner

*Primary Examiner*—Stuart Hendrickson
(74) *Attorney, Agent, or Firm*—Ronald M. Anderson

(57) ABSTRACT

High-power inductively coupled plasma technology is used for thermal cracking and vaporization of continuously fed carbonaceous materials into elemental carbon, for reaction with separate and continuously fed metal catalysts inside a gas-phase high-temperature reactor system operating at or slightly below atmospheric pressures. In one particularly preferred embodiment, in-flight growth of carbon nanomaterials is initiated, continued, and controlled at high flow rates, enabling continuous collection and product removal via gas/solid filtration and separation methods, and/or liquid spray filtration and solid collection methods suitable for producing industrial-scale production quantities. In another embodiment, the reaction chamber and/or filtration/separation media include non-catalytic or catalytic metals to simultaneously or separately induce on-substrate synthesis and growth of carbon nanomaterials. The on-substrate grown carbon nanomaterials are produced in secondary chambers that are selectively isolated for periodic removal of the product.

46 Claims, 16 Drawing Sheets

CONTINUOUS PRODUCTION OF CARBON NANOMATERIALS USING A HIGH TEMPERATURE INDUCTIVELY COUPLED PLASMA

RELATED APPLICATIONS

This application is based on prior provisional application Ser. No. 60/477,710, filed on Jun. 10, 2003, the benefit of the filing date of which is hereby claimed under 35 U.S.C. §119 (e).

FIELD OF THE INVENTION

The present invention relates to method and apparatus for utilizing an inductively coupled plasma torch to produce carbon nanomaterials, and more specifically, relates to a method and apparatus for producing graphitic single-wall carbon nanotubes, graphitic multi-walled carbon nanotubes, graphitic carbon nanofibers, and amorphous carbon nanowires in a continuous-flow, in-flight production process.

BACKGROUND OF THE INVENTION

Carbon nanotubes are seamless tubes of graphite sheets with complete fullerene caps and were first discovered as multi-layer concentric tubes or multi-walled carbon nanotubes, and subsequently, as single-wall carbon nanotubes. Nanotubes are typically formed in the presence of transition metal catalysts. Carbon nanotubes have shown promise in applications such as nanoscale electronic devices, high strength materials, thermally and electrically conducting materials, electron field emission devices, tips for scanning probe microscopy, gas filtration, and gas storage.

For a number of applications, single-wall carbon nanotubes (SWCNTs) are preferred over multi-walled carbon nanotubes, because they have fewer defects and are therefore stronger and more conductive than multi-walled carbon nanotubes (MWCNTs) of similar length. Defects are less likely to occur in SWCNTs. MWCNTs can survive occasional defects by forming bridges between unsaturated carbon valances, while SWCNTs have no neighboring walls to compensate for such defects.

The availability of carbon nanotubes in quantities necessary for practical technology development and application is problematic. The development of efficient processes for producing carbon nanotubes of consistent high quality in quantity is the key to the commercialization of specialty carbon nanomaterials (CNMs).

Conventional carbon fiber materials and fiberglass are used as additives in composite polymeric materials, for structural reinforcement. Conventional carbon fibers and metal fibers are used as additives in polymers to provide electrical conductive properties required to dissipate static electricity, to provide electromagnetic shielding, and to increase thermal conductivity. Graphite carbon nanofibers have been utilized as a replacement additive for conventional carbon fibers, resulting in improvements in the mechanical and electrical properties of numerous polymer blends. Significant reduction in weight and production costs of finished products has been demonstrated. Although several companies in the conductive plastic industry are starting to incorporate carbon nanofibers in their products, they cite price, product consistency, and supply reliability as major issues. It would therefore be desirable to develop a method and apparatus for cost effectively producing commercial quantities of CNMs.

It is recognized that amorphous carbon nanowires have lower mechanical strength and electrical conduction than carbon nanotubes. However, carbon nanowires have large active surface areas that appear to be beneficial for applications such as ultra-filtration and hydrogen storage. The suitability of carbon nanowires for such applications is currently under investigation.

Presently, there are three main approaches for synthesis of carbon nanotubes. These include the laser ablation of carbon (Thess, A. et al., *Science* 273:483 (1996)), the electric arc discharge of a graphite rod (Journet, C. et al., *Nature* 388:756 (1997)), and the chemical vapor deposition (CVD) of hydrocarbons (Qin, L. et al., *Appl. Phys. Lett.* 72:26 (1998)).

SWCNTs are reported to have been produced at a rate of 10 grams per day by CVD in a high-pressure (30 to 50 atm), high-temperature (900° C. to 1,100° C.) process (HiPco Process), using carbon monoxide (CO) as the carbonaceous precursor material and a liquid catalyst in a small continuous-flow reactor (Bronikowski, M. et al., *J. Vac. Sci. Technol. A* 19(4), (2001)). Such a technique suffers from the disadvantages of requiring high pressure systems (which significantly increases operating costs), having a production rate that is insufficient to meet the anticipated demand for CNMs, and for being able to utilize only a single feedstock (CO). It would therefore be desirable to provide a method and apparatus for producing CNMs that does not require high pressure systems, that can produce larger quantities of CNMs, and which can use various different feed stocks.

The production of MWCNTs by catalytic hydrocarbon cracking is now being achieved on a commercial scale (see U.S. Pat. No. 5,578,543), while the production of SWCNTs is still only achievable in gram scale quantities by the laser ablation technique (Smiljanic, O. et al., *INRS Energie et Materiaux*, Canada, Sa-PS2-Sy27, Log No. P109, (2002)) and arc discharge technique. Both the laser ablation method and the arc discharge method suffer from being difficult to implement as large quantity production processes (Zheng, B. et al., *Appl. Phys. A*74:345-348 (2002)). New and refined techniques for SWCNTs production are in the introduction phase (Resasco et al., U.S. Pat. No. 6,333,016).

CVD over transition metal catalysts (on-substrate method) has produced both MWCNTs and SWCNTs. The catalyst selection and surface preparation strongly influence the CNM morphology. Laser ablation, arc techniques, and the catalytic hydrocarbon cracking process can be used for the production of SWCNTs. Dai et al. demonstrated web-like SWCNTs resulting from the disproportionation of carbon monoxide (CO) with a molybdenum (Mo) catalyst supported on alumina, heated to 1200° C. From the reported electron microscope images, the Mo metal apparently attaches to the nanotubes at their tips. The reported diameter of SWCNTs generally varies from 1 nm to 5 nm, and seems to be controlled by the particle size of the Mo catalyst. Catalysts containing iron, cobalt, or nickel have been used at temperatures between 850° C. to 1200° C., to form MWCNTs (U.S. Pat. No. 4,663,230). Rope-like bundles of SWCNTs have been generated during the thermal cracking of benzene with an iron catalyst and sulfur additives, at temperatures between 1100° C.-1200° C. The synthesized SWCNTs are roughly aligned in bundles and woven together like those obtained from the laser ablation and electric arc methods.

Vaporizing targets, including one or more Group VI or Group VIII transition metals, and graphite using lasers to form SWCNTs have been proposed. The use of metal catalysts, including iron and at least one element selected from Groups V (V, Nb, and Ta), VI (Cr, Mo, and W), VII (Mn, Tc, and Re), or the lanthanides, has also been proposed (see U.S.

Pat. No. 5,707,916). Recently, new methods have been proposed that use catalysts to produce quantities of nanotubes having a high ratio of SWCNTs to MWCNTs (Resasco et al., U.S. Pat. No. 6,333,016).

As applications for graphite carbon nanotubes, carbon nanofibers, and amorphous carbon nanowires develop, the demand for these products will grow. Market introduction of CNM for producing products and in other applications is highly dependent on the availability of cost effective production methods.

The majority of the processes described above involve growing the CNM on a substrate. On-substrate growth rates of up to 145 nm per second are reported by Portland State University, for the synthesis of multiple-wall carbon nanotubes, with tube lengths of tens of micrometers, suggesting growth durations of more than one minute. However, these on-substrate growth processes are batch mode processes, and as such, are restricted to relatively low production rates. Substrate preparation is labor intensive and time consuming, as is product collection and refinement. It would be desirable to develop a method and apparatus for producing commercial quantities of such CNMs in a less labor intensive and more efficient manner.

Of the above-described processes, the only continuous production process (the HiPco Process introduced by M. Bronikowski et al.) appears to be limited to a production of 10 g/day (or less than 5 kg/year) of SWCNTs. Such nanotubes are rather short in length compared to other CNMs, which translates to relatively short durations in a temperature-controlled annealing reactor. Continuous-flow methods at production rates of many hundreds of tons per year of product are required to enable large scale introduction of CNMs, and to reduce unit product costs.

It is noted that the purification and separation of mixed CNMs significantly increases the costs of carbon nanotube production. Continuous processing of materials versus batch mode processing (such as the substrate-based CVD process) offers significant cost reduction potential, due to significant increases in production rates, which requires continuous product collection, product removal, separation, and purification (if needed). It would therefore be desirable to develop a method and apparatus for product collection, product removal, and product separation of different CNMs. It would further be desirable to develop a method and apparatus adapted to produce CNMs that do not require a high level of separation and purification.

Inductively coupled plasma (ICP) systems are used in a wide range of applications, including gas spectroscopy, plasma spraying, materials synthesis, waste destruction and waste-to-energy applications (e.g., Vavruska, J. et al., entitled "Induction Steam Plasma Torch For Generating a Steam Plasma For Treating a Feed Slurry" (U.S. Pat. No. 5,611,947), and Blutke, A. et. al., entitled "Use of a Chemically Reactive Plasma For Thermal-Chemical Processes" (U.S. Pat. No. 6,153,852).

Knight, R. et al. have reported isolating carbon nanotubes from residues produced and collected in a reactor energized using an ICP, entitled "Thermal Plasma Process For Recovering Monomers and High Value Carbons From Polymeric Materials" (U.S. Pat. No. 6,444,864). Withers, J. et al., report using a variety of heating devices in the formation of free carbon and fullerene collection in soot particulate in "Methods and Apparati For Producing Fullerenes" (U.S. Pat. No. 5,876,684). This patent emphasizes the use of arc plasma technology, but ICP technology, laser beams, and microwave plasmas are listed as potential heat sources. Neither of these methods discloses in-flight synthesis or continuous product collection and removal. It would be desirable to incorporate such features in an ICP based CNM production process and related apparatus.

A substrate-based method using ICP has been published by NASA Ames Research Center (Delzeit, L. et al., *Journal of Appl. Phys.*, 91:9, (2002)), describing the production of MWCNTs grown on silicon substrates with multilayered Al/Fe catalysts. The authors recognize the benefits of ICP technology for its high ionization efficiency compared to direct current (DC) or radio frequency (RF) capacitive discharges. The process disclosed by NASA operates at very strong vacuum ($10^{-5}$ Torr) at about 800° C. and at power levels about 500 to 1000 times smaller than is achievable in ICP torches. It would be desirable to develop a process operating at standard atmospheric pressures, which employs a more energetic plasma.

Clearly, new and improved methods that are capable of economically producing large quantities of CNMs are desirable. Such methods should provide consistent product qualities, and be sufficiently flexible so as to be capable of meeting the demands of the market place.

SUMMARY OF THE INVENTION

One aspect of the present invention is directed to an economical method for producing CNMs in flight, at high production rates, by continuously injecting carbonaceous and catalytic materials into a plasma field produced by an ICP torch, and by controlling reactor chamber conditions to provide a suitable environment for the formation and growth of CNMs. The present method is suitable for the production of various CNMs, including, but not limited to, graphitic SWCNTs, MWCNTs, graphitic carbon nanofibers, and amorphous carbon nanowires.

An ICP torch (or multiple ICP torches) is used to thermally crack carbonaceous materials to form elemental carbon, by introduction of the carbonaceous material into the ICP jet. It should be understood that carbonaceous feed materials can also be introduced into a process reactor through the torch (i.e., along with the plasma gas), as well as into portions of the process reactor that are not adjacent to the plasma jet. However, introducing at least some of the carbonaceous material into the ICP jet is preferred. This carbonaceous material reacts with catalytic metals to initiate the formation and growth of CNMs in a flowing gas stream. The catalytic metals are continuously introduced into the reaction chamber either separately or with the carbonaceous material. The process is conducted in a high-temperature reaction chamber designed for operation at or below atmospheric pressure, and control of high continuous flow rates.

The reaction chamber is configured to support the in-flight production of CNMs and includes either minimal or none of the baffles commonly found in other gas phase reaction chambers. Such baffles would likely inhibit the free flow that is desired to optimize the in-flight production of CNMs. The walls of the reaction chamber are preferably smooth, to minimize the amount of free carbon or CNMs deposited there. Preferably, the CNMs remain entrained within the gas flow until separated by filtration for recovery. The walls of the reaction chamber do not include any metals known to act as catalysts for the production of CNMs, to avoid deposition of CNMs on the walls. Non metallic, smooth reaction chamber walls are thus preferred. Quartz, glass, and ceramics are preferred materials for the walls of the reaction chamber.

The longer the residence time of the gas stream within the system, the longer (and larger) the CNMs that will be produced. Note that increasing the velocity of the gas flow within the reactor will reduce the likelihood of CNMs being deposited on the walls of the reaction chamber, but will also minimize the residence time. Reaction chamber size and gas flow rates can be adjusted based on the target size of the CNMs to be produced.

In a main process for configuring a system to produce CNMs, the process conditions are established and controlled using the high-temperature gas phase environment provided by the ICP torch to enable continuous vaporization and mixture of the precursors for CNM formation and in-flight growth of CNMs entrained in the gas phase reactor. Due to the continuous-flow operation throughout the entire production process, the on-line production times of the ICP production process are expected to be comparable or higher than conventional carbon black production methods.

In addition, the reaction chamber and/or filtration/separation media optionally includes non-catalytic or catalytic surfaces to simultaneously or separately establish on-substrate growth of CNMs.

Because the catalyst and CNMs are entrained in the gas stream exiting the reactor, the gas stream can be filtered to selectively recover the CNMs and the catalyst. Since by their nature catalysts are not consumed in a reaction, the catalyst can be recovered from the gas stream exiting the reactor and reused. Filtering the gas stream exiting the reactor to recover the CNMs is significantly more efficient than recovering CNMs from surfaces within a reactor, or from carbon deposits within a reactor. The moving gas stream is easily directed into a filter unit, where the CNMs are removed from the gas stream. In at least one embodiment, the filter unit simply removes particles entrained in the gas stream; such particles may include particles of the catalyst, and larger-sized, less valuable carbon materials (such as soot). The particles from the filter unit can optionally be purified to separate the catalysts from the carbon material. Further, the carbon materials can optionally be purified to separate the CNMs from the less valuable carbon materials. The filter unit is configurable to separate the CNMs into different fractions. Several techniques, including the use of centrifugal forces (or more precisely, centripetal forces) and electrostatic forces are employed to segregate CNMs by size. The less valuable carbon materials are then reintroduced into the reactor, to be reformed into free carbon by the ICP, to enable more CNMs to be produced.

During the production process, the CNMs can be integrated into a product, to enhance the value of the product. For example, CNMs can be added to a fuel, to increase its energy density. CNMs can also be added to a polymer to provide improved structural, electrical conductivity, and thermal conductivity properties.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 2A:
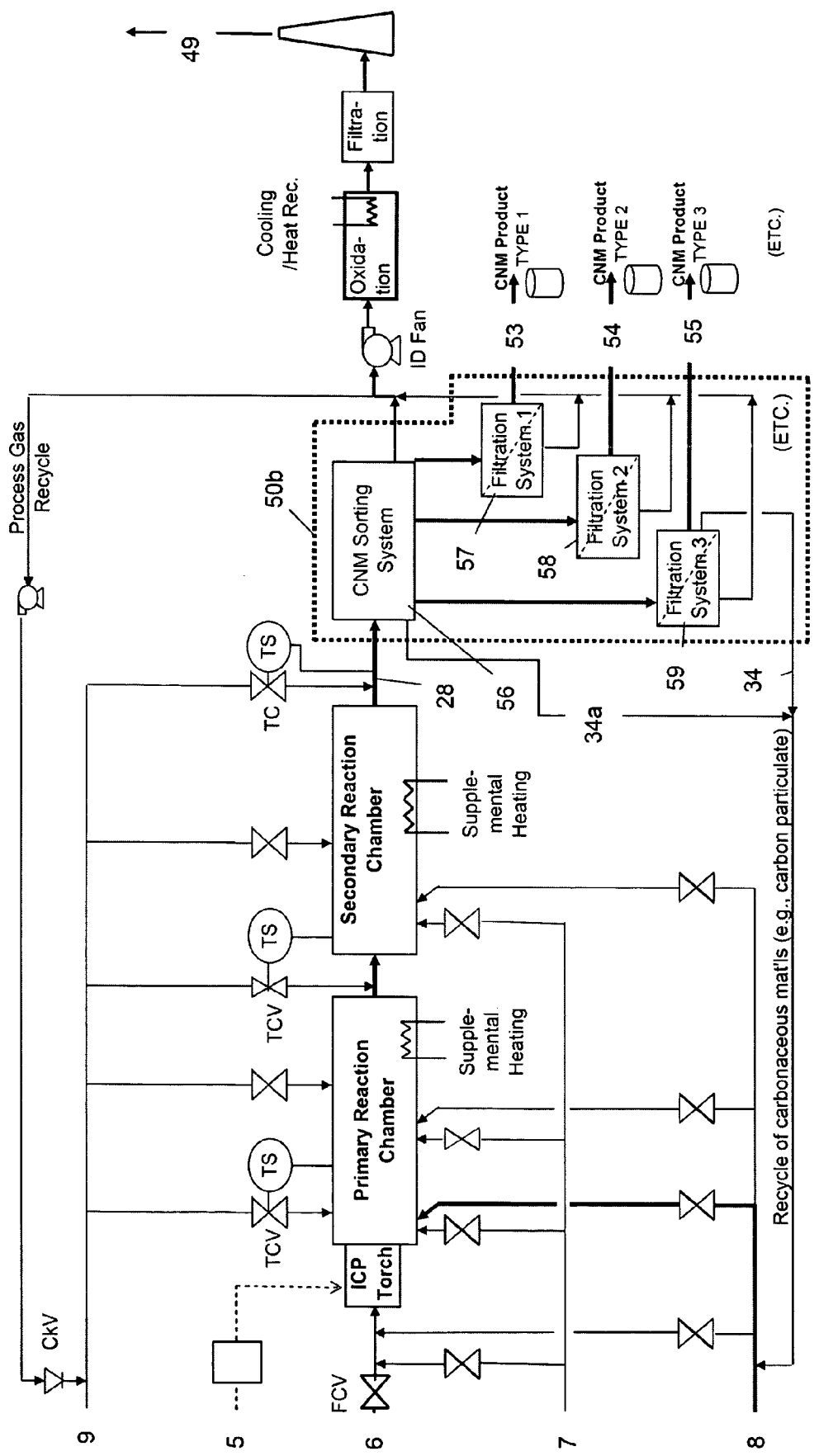
FIG. 2A is a process flow diagram for the in-flight production of CNMs using an ICP, including the sorting of CNMs by size, in accord with another aspect of the present invention.
Figure 2B:
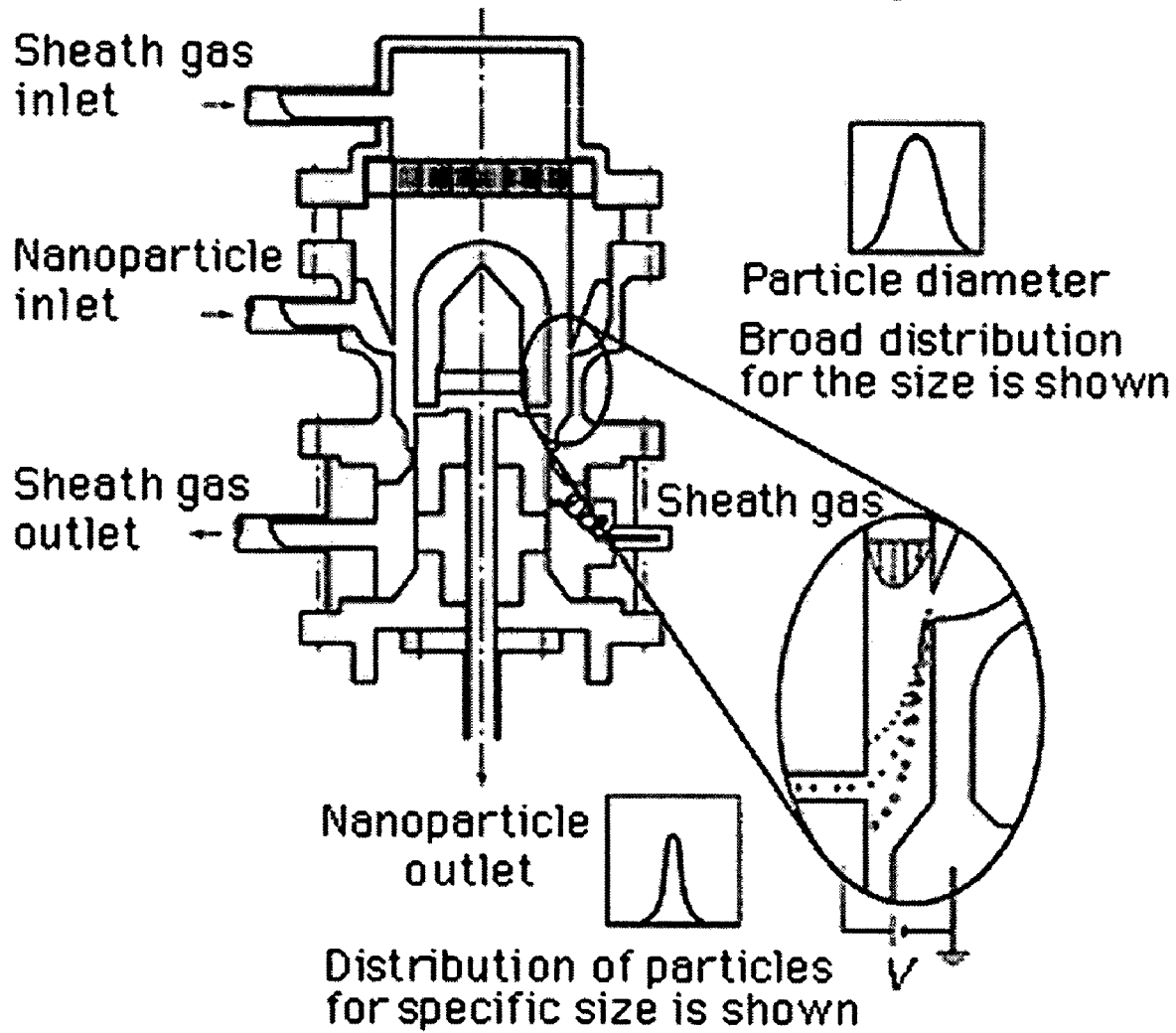
Figure 3:
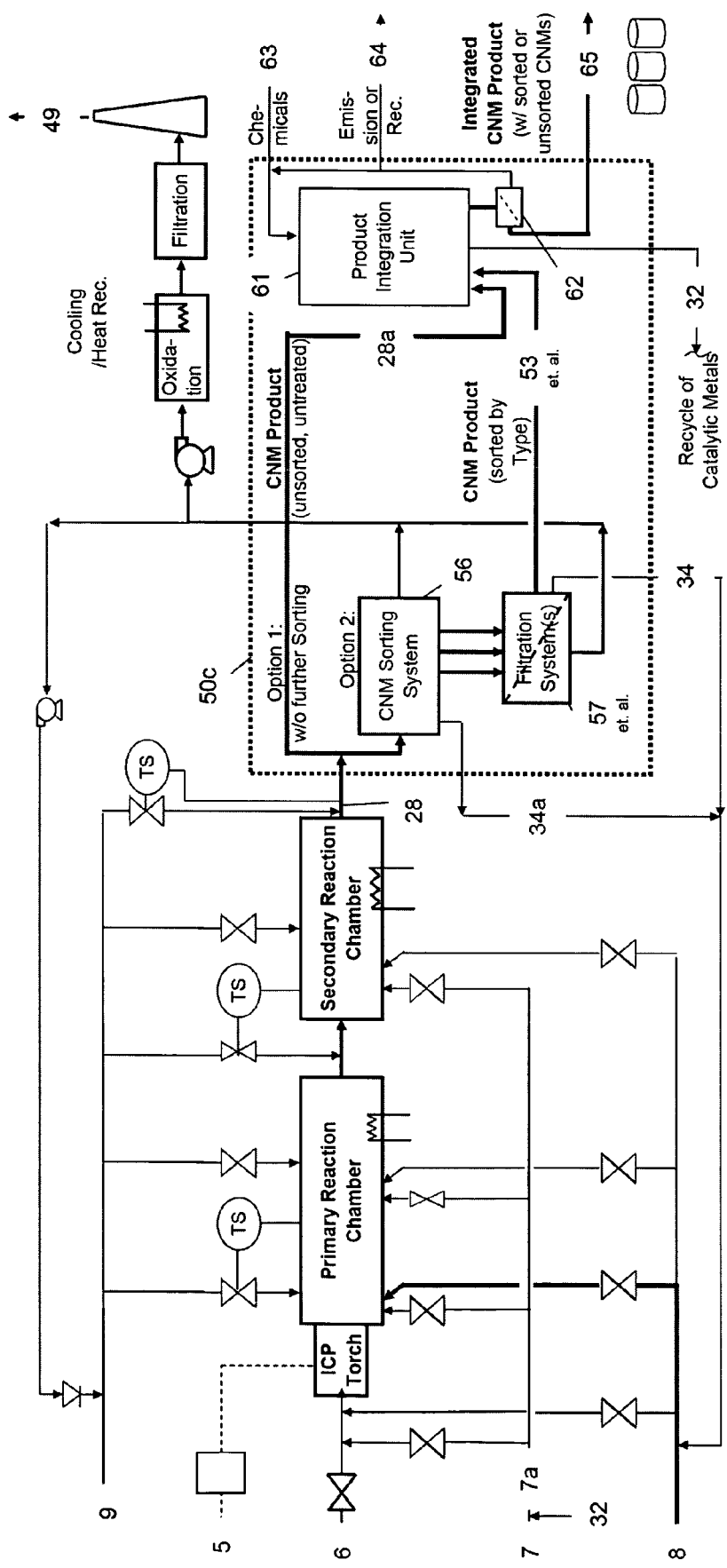
Figure 4:
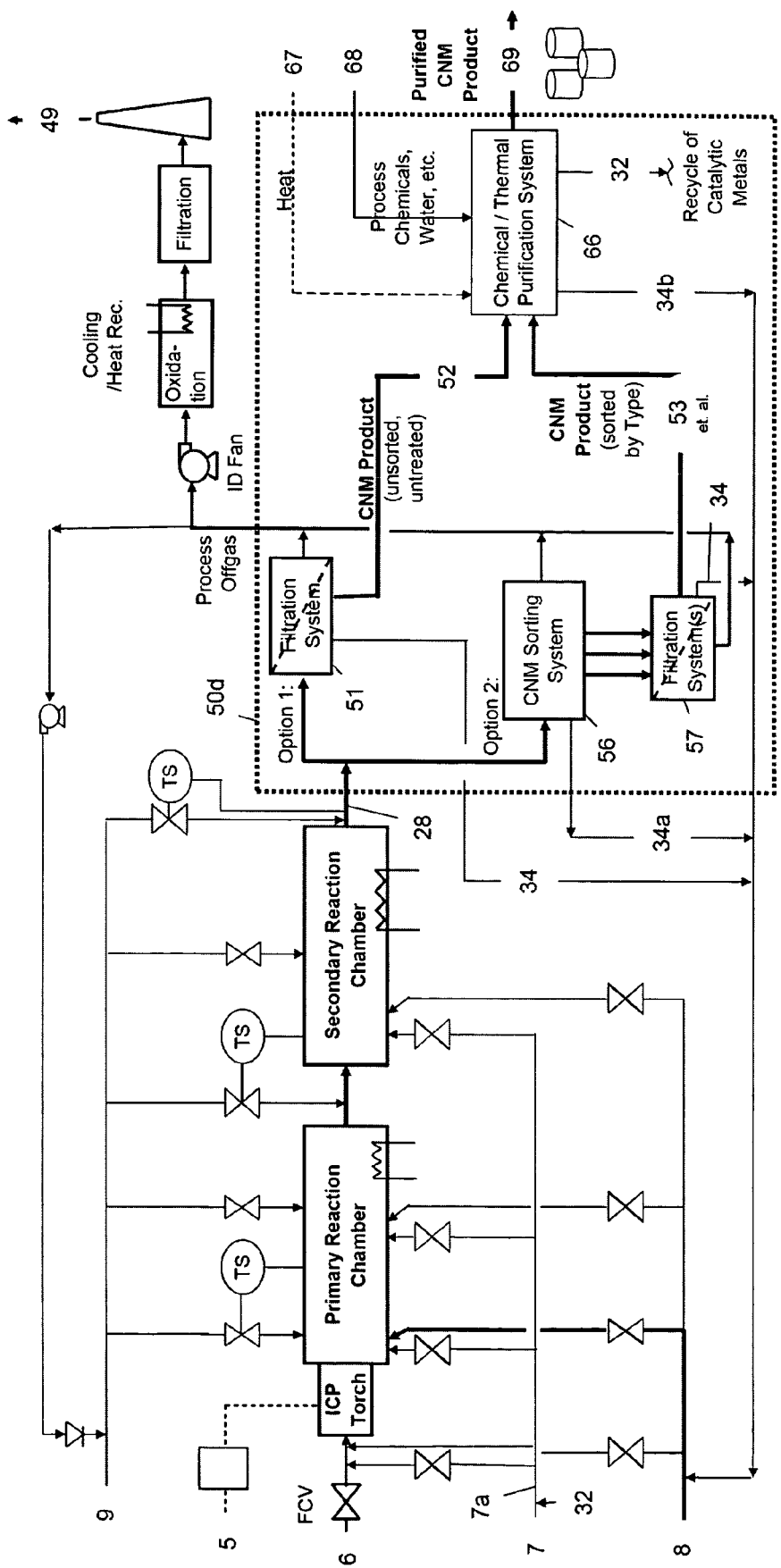
Figure 5:
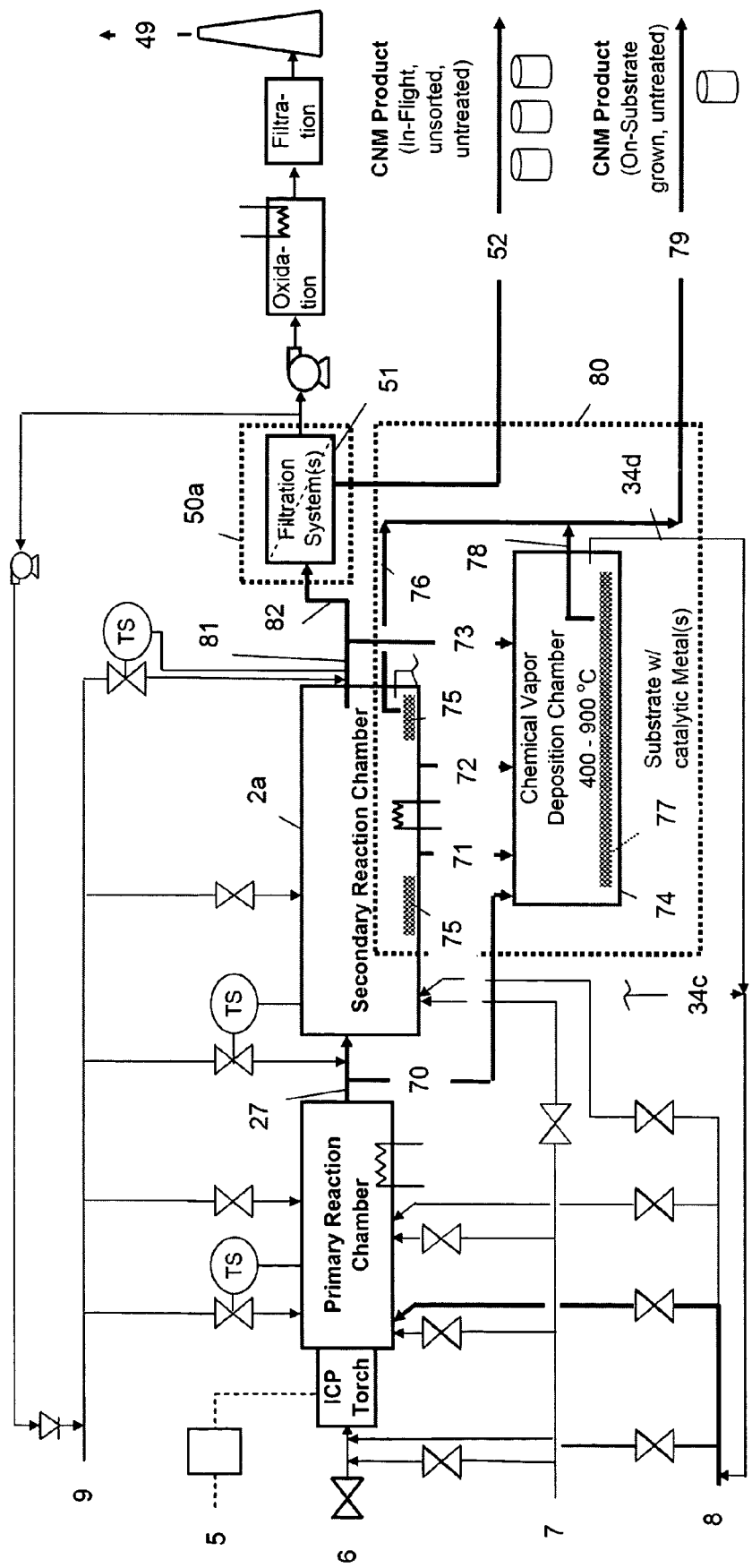
Figure 6A:
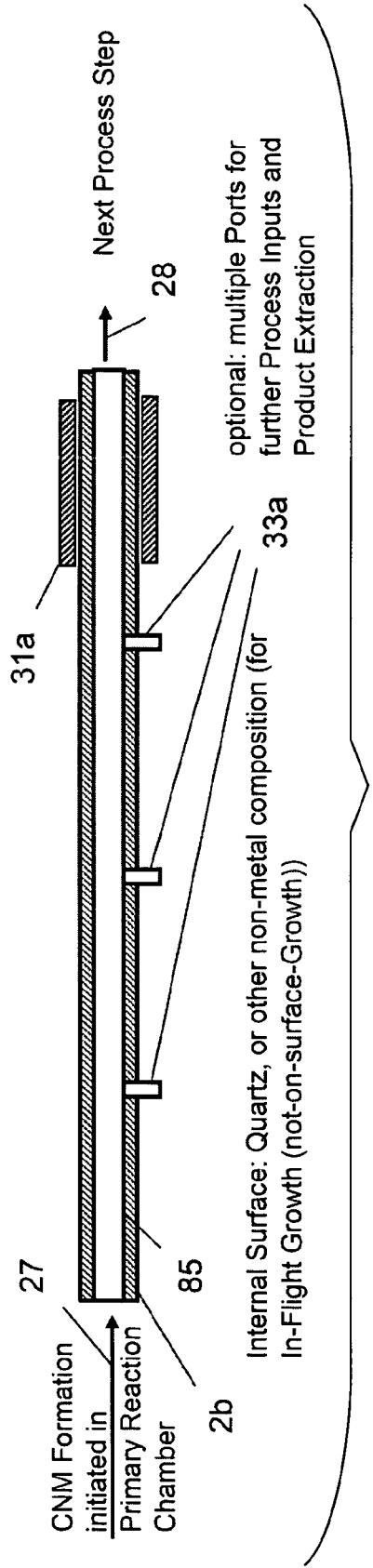
Figure 6B:
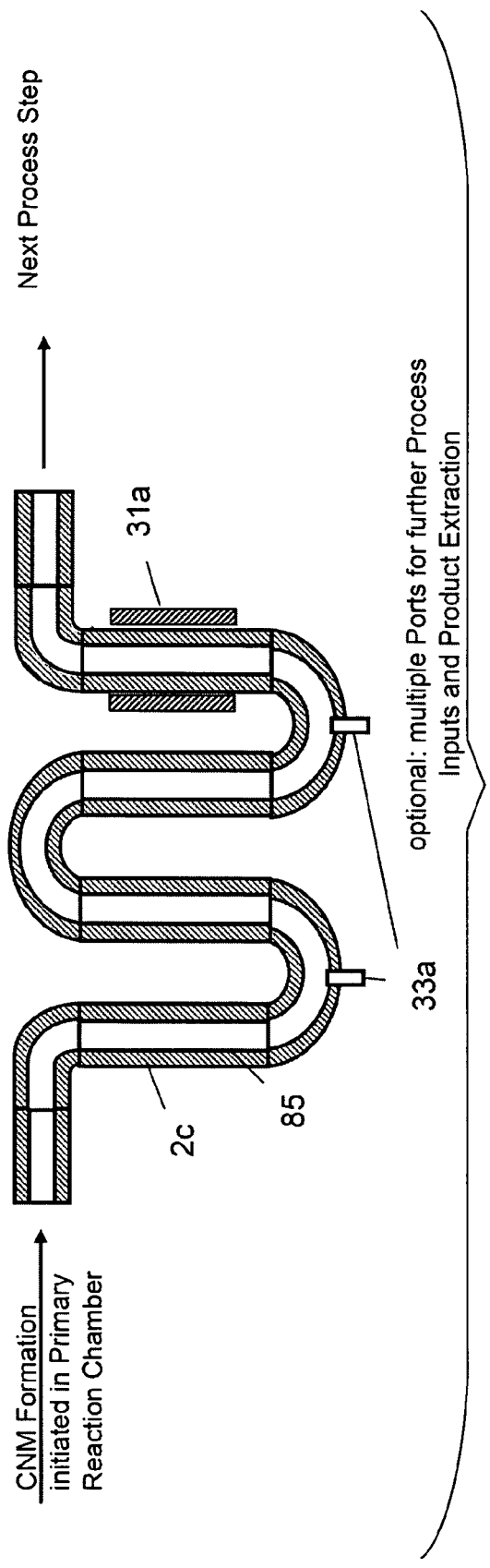
Figure 7:
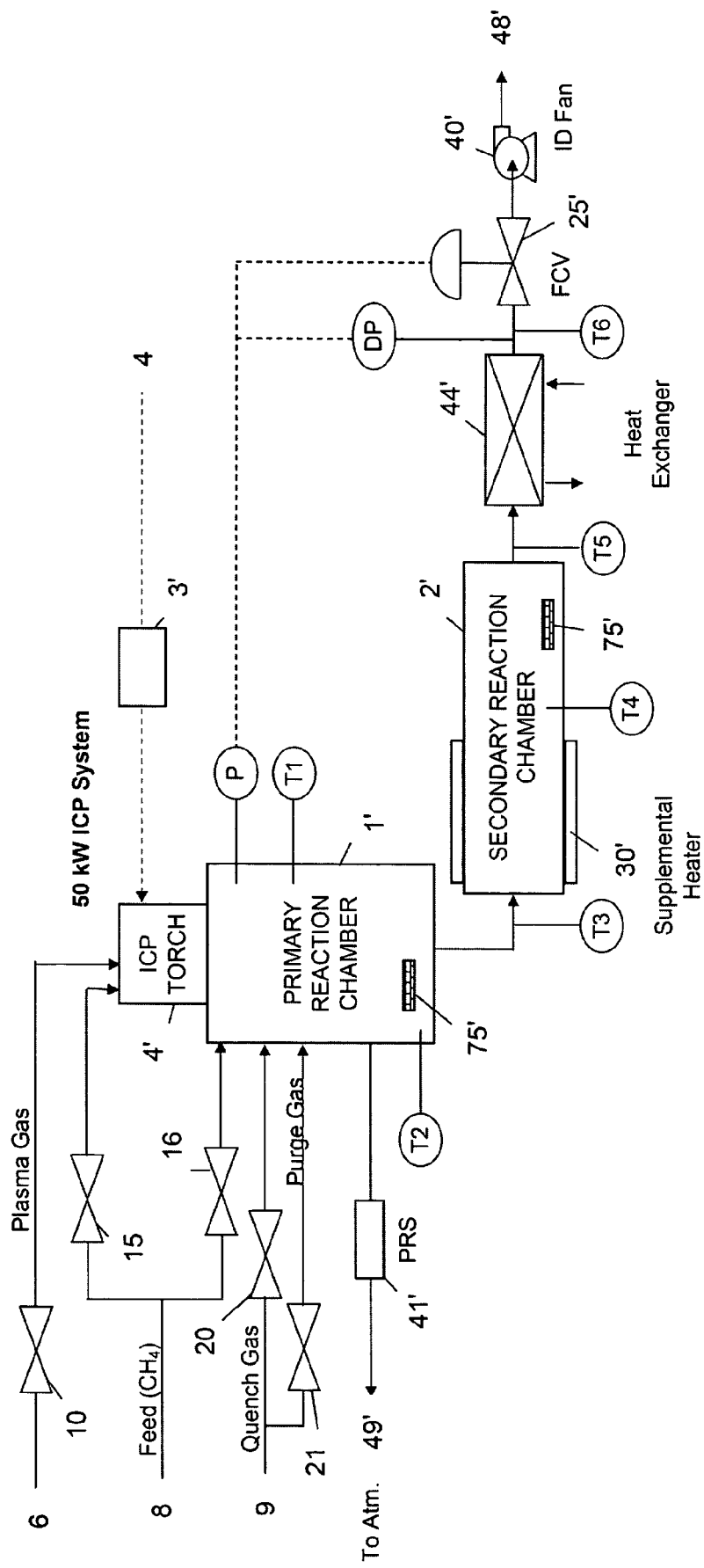
Figure 8:
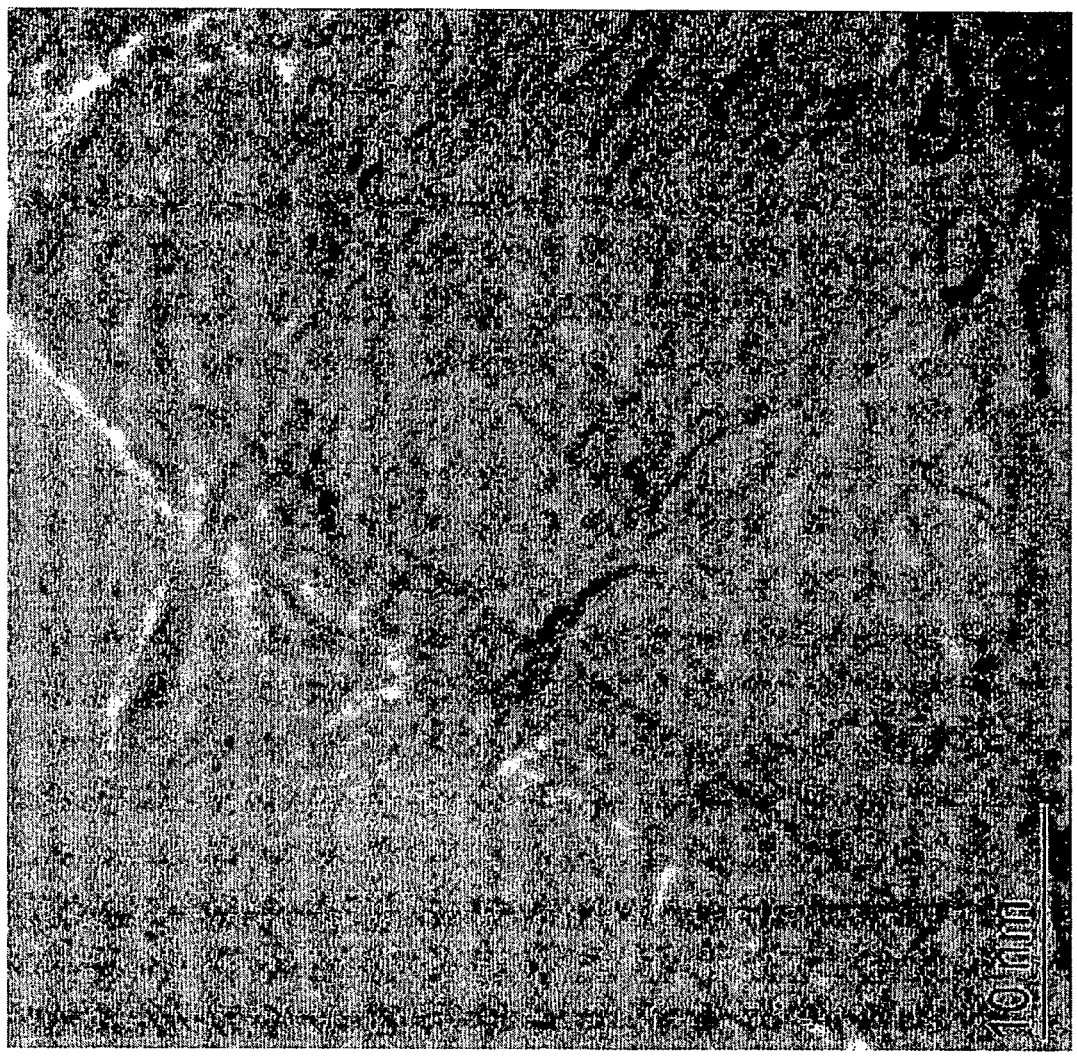
Figure 9:
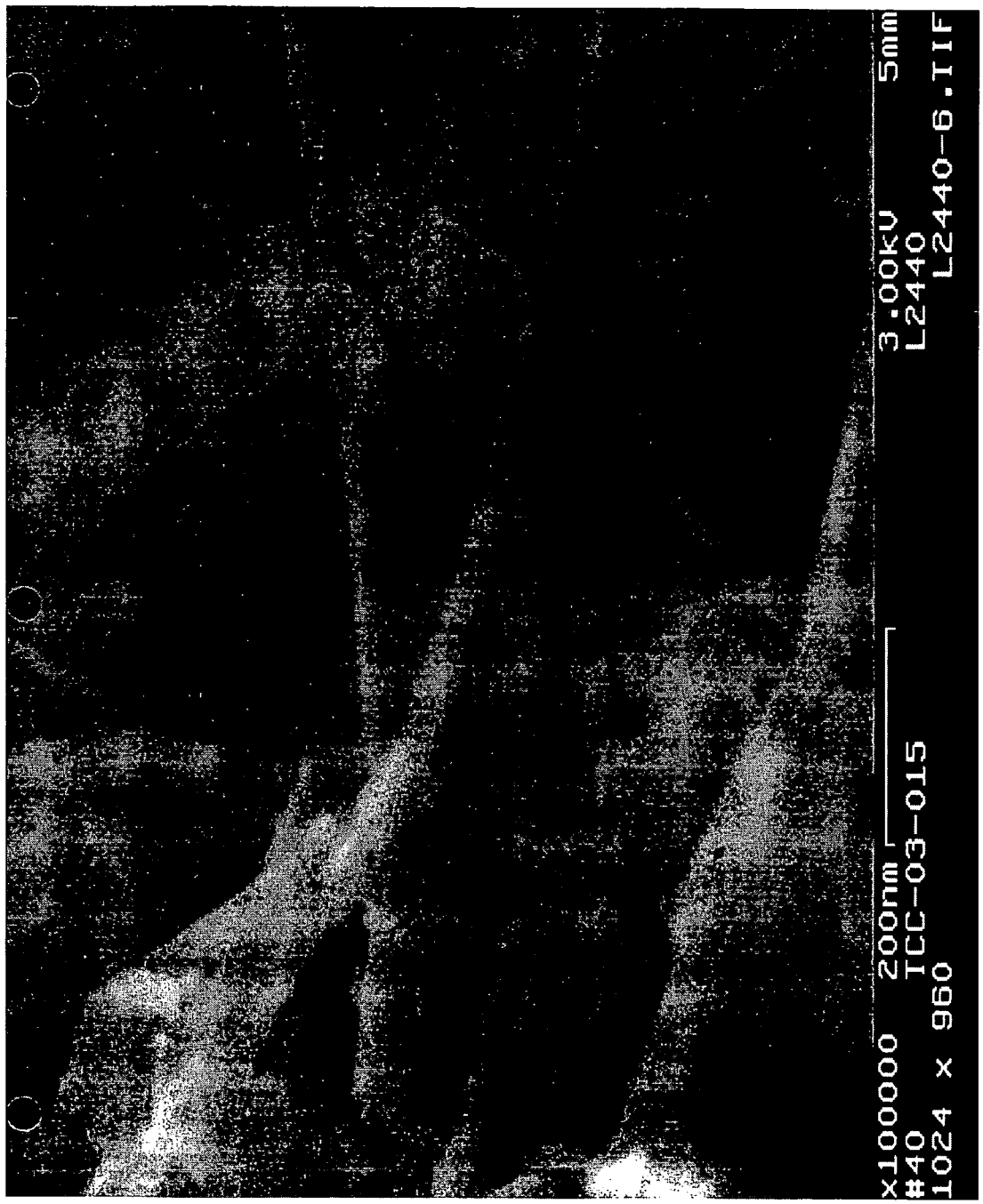
Figure 10:
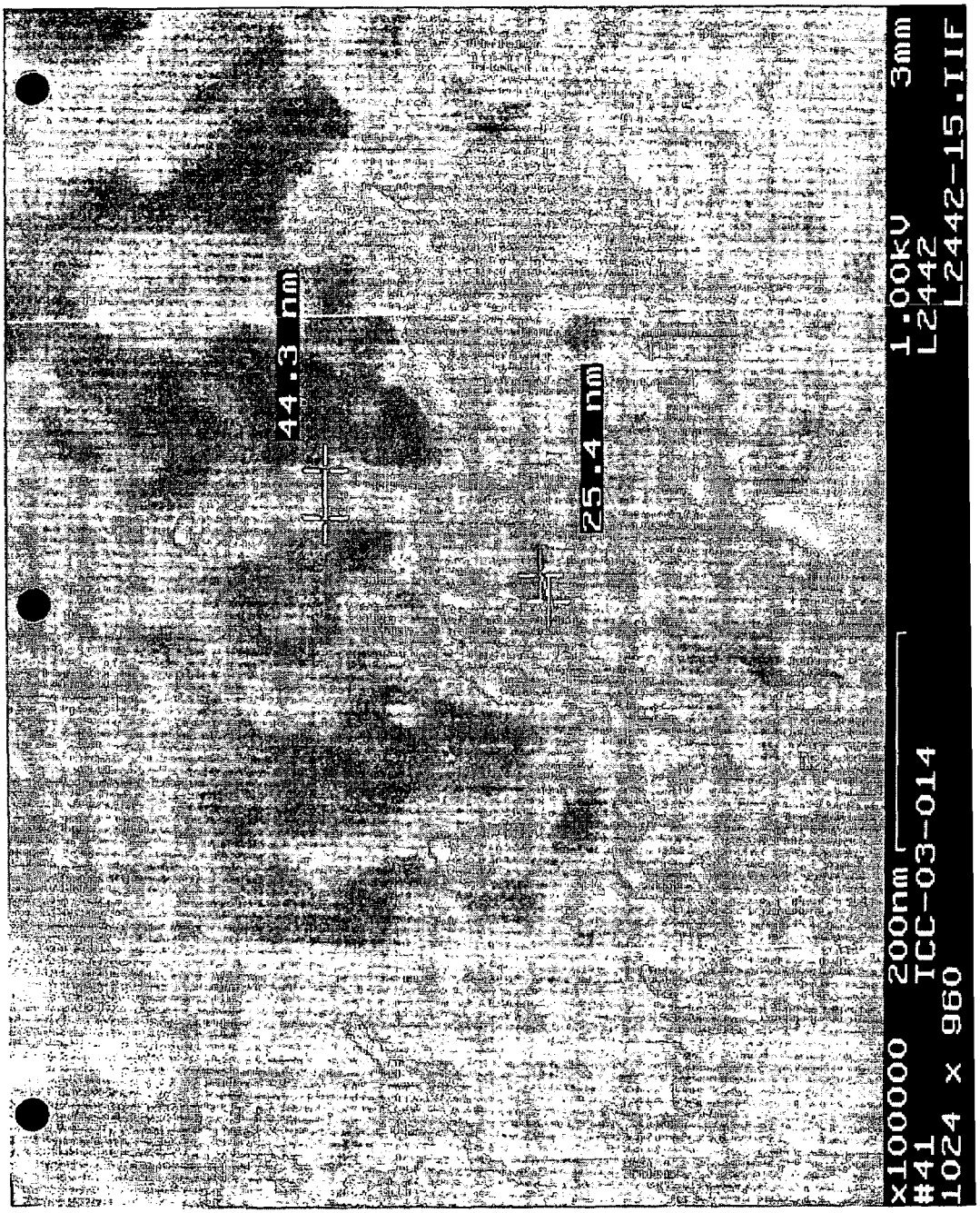
Figure 11:
Figure 12:
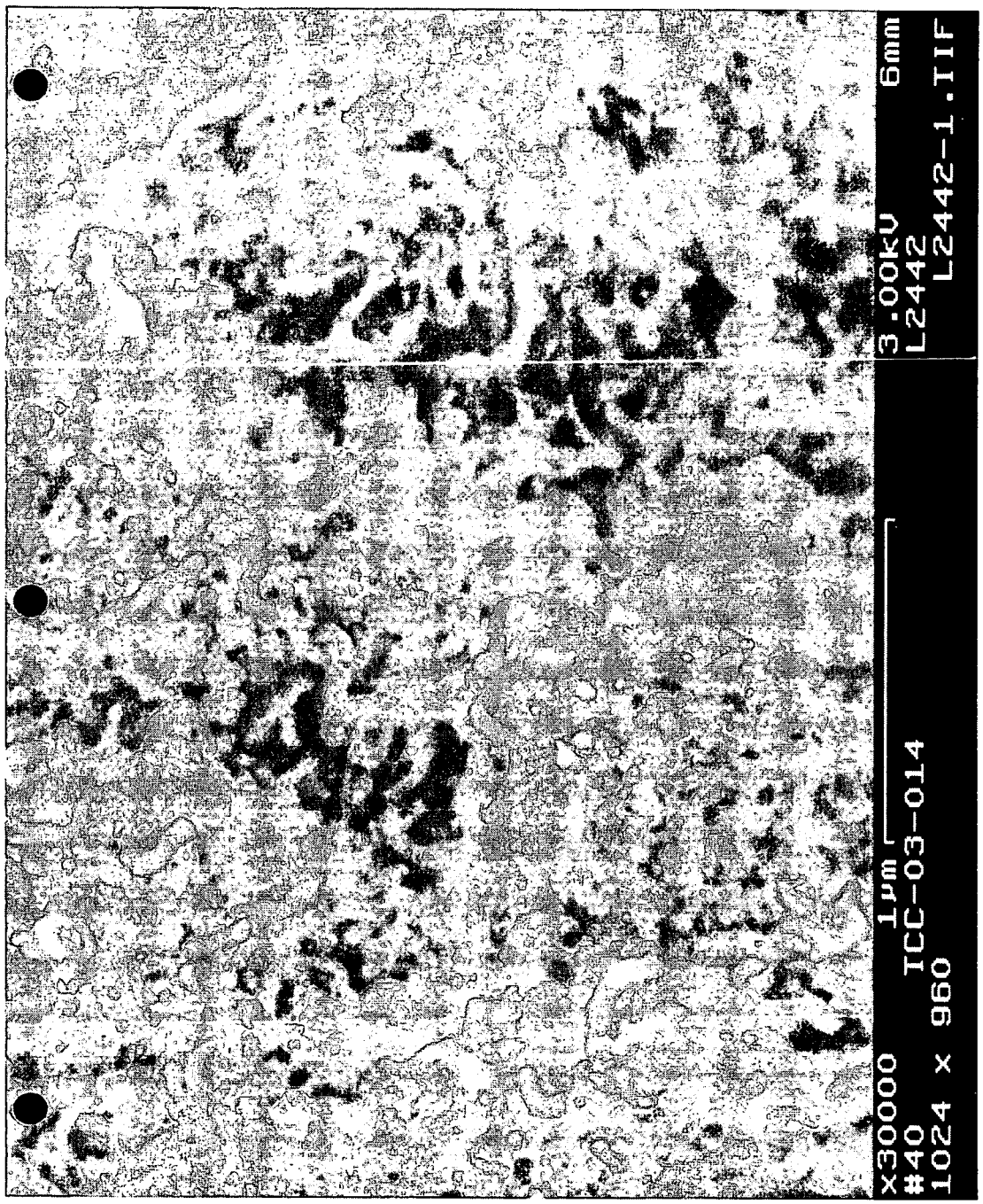
Figure 13:
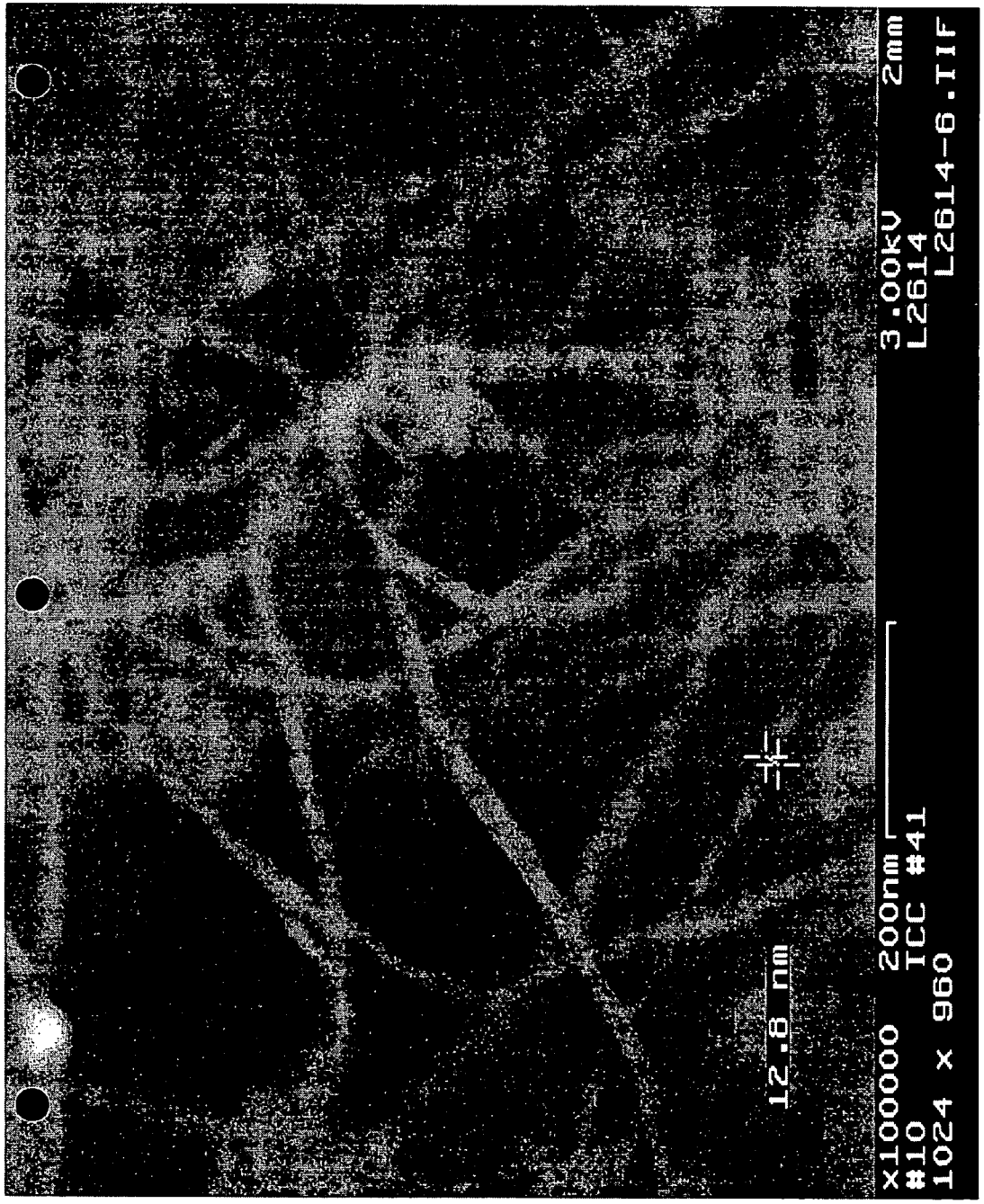
Figure 14:
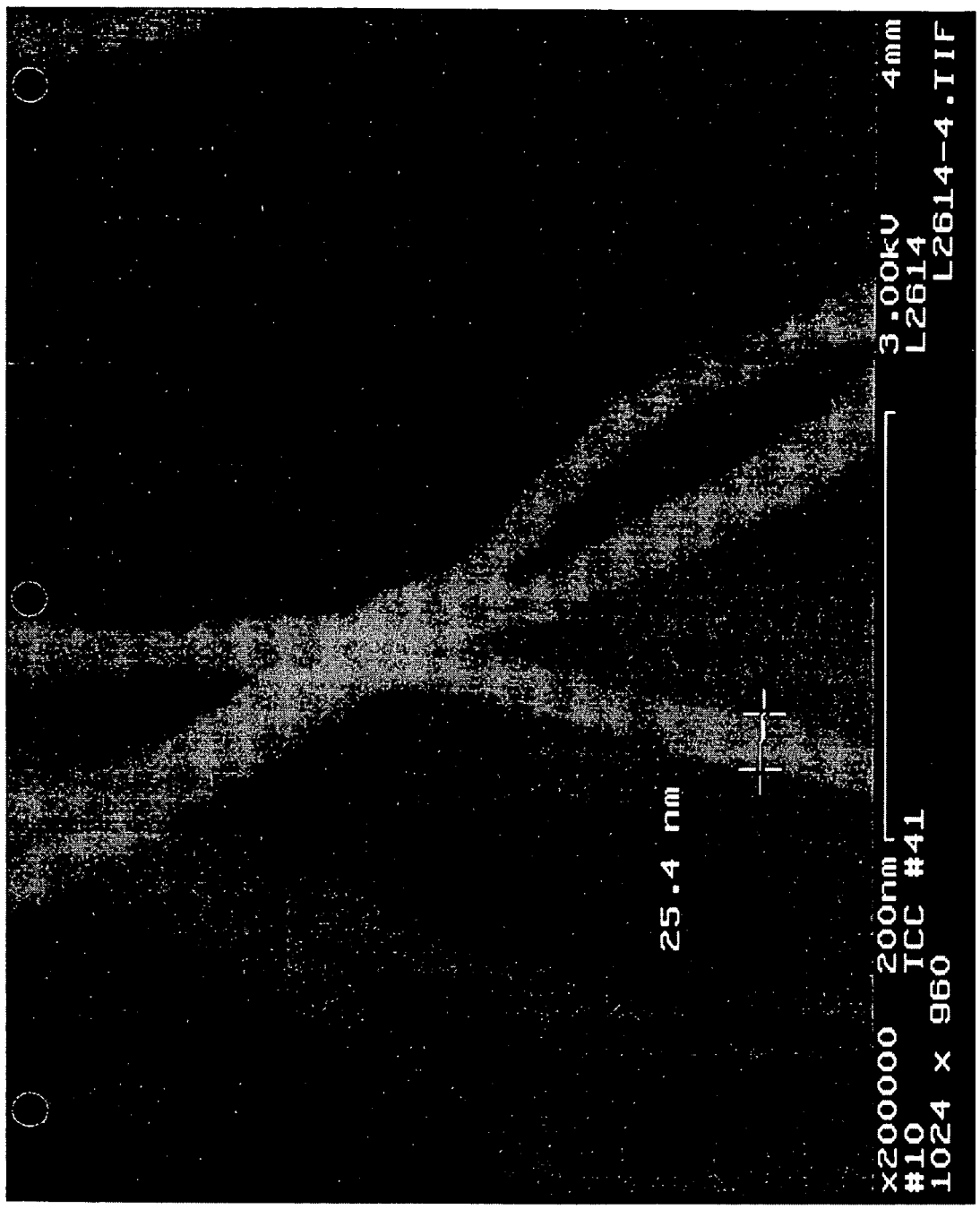
Figure 15:
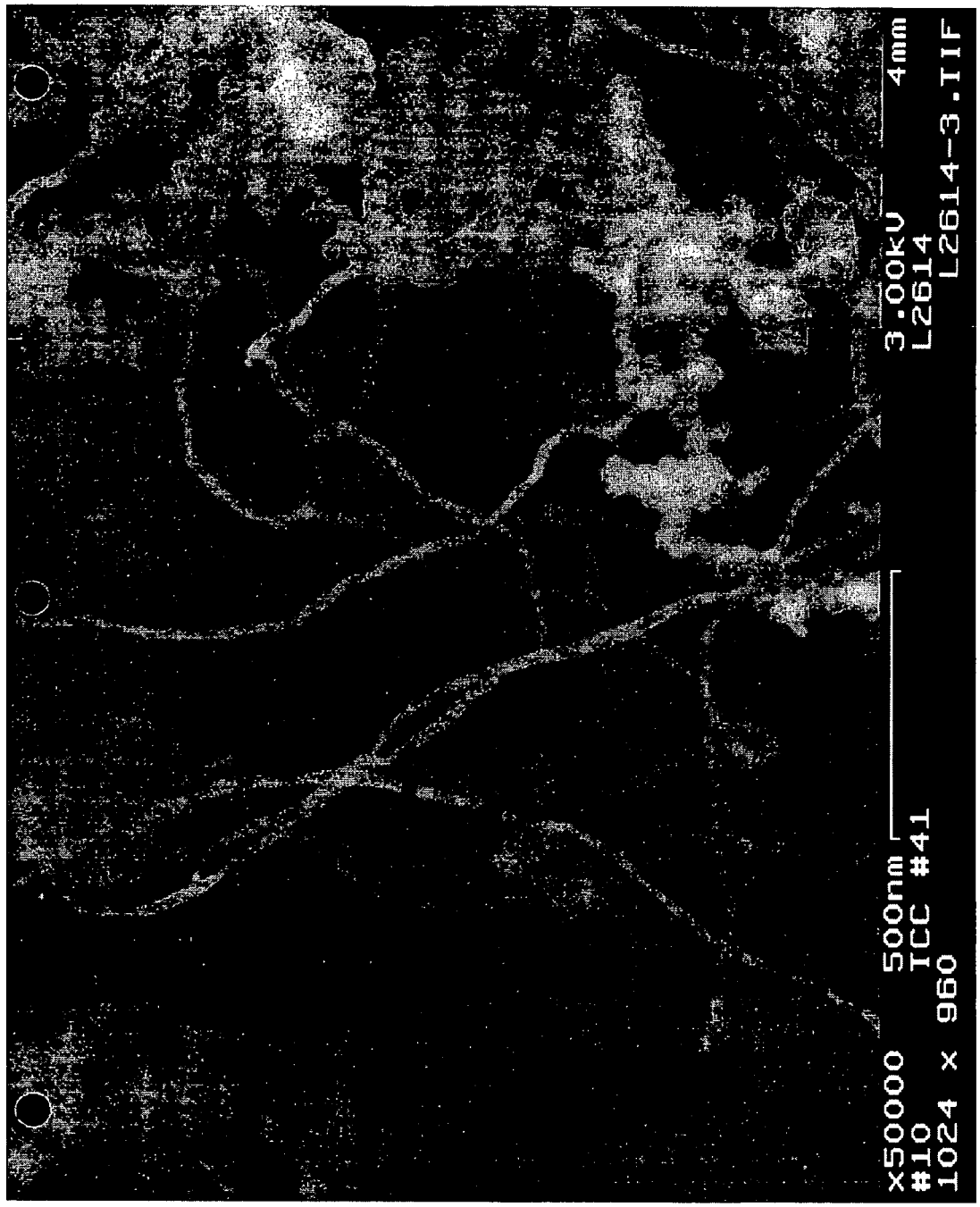

FIG. 2B schematically illustrates a differential mobility analyzer that can be employed to sort CNMs by size, as indicated in the process flow diagram of FIG. 2A;

FIG. 3 is a process flow diagram for the in-flight production of CNMs using an ICP, including product integration of CNMs, in accord with another aspect of the present invention;

FIG. 4 is a process flow diagram for the in-flight production of CNMs using an ICP, including purification of CNMs in accord with yet another aspect of the present invention;

FIG. 5 is a process flow diagram for a combined process, including both the in-flight production and substrate based production of CNMs using an ICP, in accord with still another aspect of the present invention;

FIGS. 6A and 6B schematically illustrate secondary reaction chambers for use in any of the processes of FIGS. 1-5;

FIG. 7 is a process flow diagram of a test system employed to generate empirical data related to the present invention;

FIG. 8 is a transmission electron microscopy (TEM) image of multi-wall carbon nanotubes grown on a substrate;

FIG. 9 is a scanning electron microscopy (SEM) image of multi-wall carbon nanotubes grown in-flight and collected on a front face of a process gas heat exchanger;

FIGS. 10-12 are SEM images of carbon nanowires grown on stainless steel reactor walls at temperatures of 700° C.; and FIGS. 13-15 are SEM images of carbon nanomaterials grown on stainless steel sheet metal at temperatures of about 1,000° C.

DESCRIPTION OF THE PREFERRED EMBODIMENT

A method discussed below is used to produce CNMs in a gas phase reaction using the high temperature gas emitted from an ICP torch to crack carbonaceous materials in a flowing gas stream, where the carbon is mixed with suitable catalytic materials in the presence of other gaseous elements that promote the formation of the CNMs. This method offers flexibility in the production of various CNMs, including but not limited to graphitic SWCNTs, graphitic MWCNTs, graphitic carbon nanofibers, and amorphous carbon nanowires.

The continuously operated and controlled gas-phase reaction process uses a high-power ICP torch as the main source of heat for continuous thermal cracking of carbonaceous materials to provide free carbon, and for heating nano-scale metal-based catalysts (the generation of nano scale catalyst particles is discussed in greater detail below). The heated carbon and catalyst serve as precursors for the formation of CNMs downstream of the ICP torch. An initial nano-sized carbon-metal product continues to react with additional free carbon or carbon clusters and grows into larger CNMs, as long as suitable growth conditions are maintained. Thus, it will be apparent that increasing residence times of the process will lead to the production of larger CNMs.

FIGS. 1-5 are process diagrams for different ICP based systems used for producing CNMs. The following comments relating to feed stocks, production techniques and process conditions apply to each of the systems in FIGS. 1-5. Characteristics of each individual system are discussed in detail below, following a discussion of the common characteristics.

The overall reactor gas phase environment required to optimize the formation and growth of CNMs is a function of a number of different factors, including the composition of the carbonaceous materials, the metal catalyst (or precursor) used, the plasma gas mixture, the bulk gas-phase density, the degree of mixing between the carbon and the catalyst, any additional process materials input into the reactor vessel, the relative purities of the input streams, the reactor surfaces, and process parameters. The process parameters include the reactor temperature, temperature gradient within the reactor chamber, and reactor pressures. Manipulating these parameters enables changes to be made in the quality, quantity, and types of the CNMs produced.

Many different types of plasma gases can be employed. Single gases or mixtures of gases may be used. In particular, inert gases, such as argon and helium, are expected to be useful. Nitrogen, while useful in this process, is less desirable because monatomic nitrogen and monatomic carbon bond to form cyanide molecules ($CN^-$), which aside from being toxic, uses the carbon that would otherwise be available for the formation of CNMs. A larger amount of free carbon in the process results in larger quantities of CNMs being formed. Oxidizing gases are not favored, because they tend to result in the formation of carbon monoxide (CO) or carbon dioxide ($CO_2$), which again undesirably consumes carbon that could otherwise form CNMs. More reactive gases, such as hydrogen and carbon monoxide, can also be employed. The plasma gas that is selected contributes to the gas phase environment under which the growth of CNMs is promoted, so that manipulation of the plasma gas enables changes in the CNMs produced to be effected. Mixtures of different gases (such as helium and argon) are expected to be useful in achieving specific desired results.

Carbonaceous materials can include carbon-containing powder (e.g., carbon graphite powder or carbon black), hydrocarbon gases (e.g., $CH_4$, $C_2H_6$, etc.), non-hydrocarbon gases (CO), carbonaceous liquids and hydrocarbons, or combinations thereof. Carbonaceous process gases not converted to CNMs can be recycled within the process. Cracking of the carbonaceous feed using ICP technology produces large amounts of free carbon, a principal building block in the formation and growth of CNMs.

All or part of the carbonaceous materials can be fed into the process environment in several different ways. For example, the carbonaceous materials can be fed directly through the ICP torch, or into the high-temperature plasma jet exiting the ICP torch, or both. The carbonaceous materials can be fed into the process environment along with the catalytic materials, or can be fed into the process environment separately from the catalytic materials, or both. It is preferable to introduce the carbonaceous material into the plasma jet, rather than through the ICP torch. Additional feed ports can be included in the reaction chamber to inject additional carbonaceous materials.

Catalytic metals provide nucleation sites for the initiation of the CNM growth and can be introduced in the form of powders (small particulate sizes are beneficial), liquids (e.g., metal carbonyls), or as gases. Metallic salts can also be employed. If metallic salts are employed, care should be exercised to ensure that the anionic portion of the salt does not introduce undesired compounds into the reaction chamber. Like the carbonaceous materials, catalytic materials can be introduced via the ICP torch, into the high-temperature plasma jet exiting the ICP torch, and/or along the reaction chamber system, downstream of the ICP torch.

One aspect of the present invention that facilitates the in-flight production of CNMs is the introduction of catalytic material into the gas flow within the reactor. Most other CNM production methods rely on directing free carbon onto a substrate impregnated with a catalyst, such that the CNM is produced on the surface of the substrate. While substrate-based CNM growth is effective, the process of harvesting the CNMs from the substrate is less efficient than separating CNMs from a gas flow in which they are entrained. Further, substrate growth-based methods are inherently batch processes, in that the substrates need to be regularly removed from a reactor to harvest the CNMs, and the catalytic substrate must then be returned to the reactor. In contrast, in-flight production of CNM can be achieved in a continuous process, because production continues for as long as raw materials (carbon and catalyst) are introduced into the reactor vessel at an appropriate temperature. As will be described in detail below, the gas exiting the reactor includes CNMs entrained in the gas flow, which can be continuously removed from the gas stream using conventional filtration methods.

A distinction can be made between chemical processing systems that are operated continuously, and those operated discontinuously. Discontinuous processing is generally referred to as batch processing. As used herein and in the claims that follow, the term "continuous processing" refers to a processing environment in which a continuous stream of material is processed without interruption to remove product or to replenish or replace materials used in the process. The continuous process might run without interruption for relatively long periods of time, e.g., for days or weeks, while producing a product and without the need for interrupting the process to add more reactant or catalyst, but may be interrupted from time-to-time, e.g., for maintaining the processing equipment, and not because the supply of material being treated or consumed has been exhausted. In contrast, the term "batch processing" as used herein refers to a processing environment in which a finite volume of material is processed without interruption, but only until the supply of material is exhausted or there is a need to harvest the product of the process, and in which the processing continues only for a period that is relatively short. For example, a batch process might be completed in terms of minutes or hours. Batch processing, rather than continuous flow processing, is advantageous when a limited volume of material is to be processed or because the nature of the process requires replenishment of input materials or harvesting of the output materials. An advantage of continuous processing is higher production rates and greater efficiency in producing larger quantities of product.

All materials fed into the gas-phase environment should promote the formation and growth of specific CNMs. High purity material streams (e.g., gases) are favorable to avoid unwanted secondary reactions. Favorable conditions for the growth of CNMs include, but are not limited to, the use of mixtures of helium and argon with quantities of hydrogen for generating the gas phase environment. The gas phase environment is generated by introducing plasma gases, carbonaceous feeds, and catalytic metals into the ICP system.

Further, the high-temperature gas phase environment can be adjusted or enhanced by introducing additional process streams, such as inert gases, carbon monoxide, hydrogen, and/or other inputs, at any location within the reaction chamber and process system. These process streams can also facilitate the reduction of the operating temperatures for the CNM synthesis.

It should be noted that the material streams fed into the ICP system and reaction chamber may be preheated (e.g., using heat recovery devices) to minimize overall energy consumption in the production process.

The ICP system uses electric energy to produce a thermally energetic and chemically reactive plasma gas by ionizing an input gas and any other materials fed through the ICP torch. The plasma jet exiting the ICP torch is at very high gas temperatures, which, depending on the type of plasma gas mixture employed, can exceed 10,000° C. (e.g., these high temperature can be achieved by ionizing argon gas). At controlled flow rates, an ICP torch provides a stable, continuous heat source for the process reactants.

Due to the endothermic nature of the cracking reaction, the bulk gas phase temperature is reduced in a primary section of the reaction chamber system where most of the CNM initiation occurs. The temperature is controlled by adjusting the power level of the ICP torch and feed rate of the reactants to achieve the desired bulk operating temperature. The primary reaction chamber temperatures are preferably controlled to be within a range from about 400° C. to about 1,300° C., depending on the catalyst and carbonaceous feed materials used, and the type of CNMs desired (i.e. SWCNTs versus MWCNTs). For the production of carbon nanotubes in particular, the temperature preferably ranges from about 800° C. to about 1,300° C. A single ICP torch can be employed, or if desired, multiple ICP torches can be used.

External heating can also be applied to the reaction chamber to extend the high temperature region, to promote continued CNM formation, and to control growth conditions. Suitable external heating devices or methods include resistive electric heating, combustion of carbonaceous materials, and/or process heat recovery devices (e.g., heat exchangers transferring heat from steam, process gas, etc.). Reaction temperatures are preferably maintained between about 400° C. and about 1000° C., and most preferably above about 500° C., to facilitate continued growth of the CNMs.

The high-temperature process chamber system preferably includes a primary and secondary reaction chamber. The primary chamber is designed to facilitate the plasma gas operating conditions, to initiate the formation of the CNM product, and for introduction of the main process material streams. The primary reaction chamber uses the ICP to reform a carbonaceous material into free carbon, and to vaporize the catalyst. Atoms of vaporized catalyst will combine to form nano sized metal catalyst particles. Free carbon will be attracted to the nano sized catalyst particles, and CNMs will begin to form on the nano sized catalyst particles. The introduction of the catalyst into the primary reaction chamber can be manipulated to favor certain sizes of CNMs. Larger catalyst particles will favor larger sized CNMs. In general, the longer the catalyst feed is exposed to the ICP, the smaller the average size of the nano sized catalyst particles will be. Empirical evidence suggests that nano sized catalyst particles under 5 nanometers will favor the growth of SWCNT, while nano sized catalyst particles over 5 nanometers will favor the growth of MWCNT. Where the metal catalyst is introduced as a metal carbonyl or a liquid solution of a metal salt, less energy (to be supplied by the ICP) will be required to generate nano sized catalyst particles under 5 nanometers in size. Where the metal catalyst is introduced as a metal powder (i.e. a conventional metal powder where the average particle size larger than nanometer sized), more energy (to be supplied by the ICP) will be required to generate nano sized catalyst particles under 5 nanometers in size. The longer the catalyst feed is exposed to the ICP, the more energy is available to vaporize the catalyst. Thus the average size of the nano sized catalyst particles available in the primary reaction chamber can be influenced by controlling how long the catalyst feed is exposed to the ICP (by controlling the location of the catalyst feed relative to the ICP), controlling the type of catalyst introduced (i.e. a metal powder versus a solution of metal salts or a metal carbonyl), and combinations thereof. Empirical testing in specific processing systems will enable processing conditions favoring the production of SWCNT over MWCNT (and vice versa) to be determined. The catalyst can be directed into the reactor as a separate feed, or the catalyst can be introduced into the reactor along with the plasma gas used to generate the ICP. For example, introducing a metal powder into the feed gas used to generate the ICP can be used to generate nano sized catalyst particles.

The secondary reaction chamber is employed for controlling and maintaining optimal reaction temperatures for continued CNM growth (a process referred to as annealing), with the integration of external heating, and to provide the residence time required for desired CNM growth (measured, e.g., in nanotubes length or fiber length). The supplemental heating for the secondary reaction chamber is used to ensure that the process gases in the secondary reaction chamber do not cool below a threshold value (which is based on the specific catalyst employed). As long as the secondary chamber is kept above the threshold value, CNM formation will continue to occur in the secondary reaction chamber. Additional carbonaceous material can be introduced into the secondary reaction chamber, to provide sufficient free carbon to maintain the growth of the CNMs. Introducing excess carbonaceous materials into any one portion of the system (i.e. into either the primary reaction chamber or the secondary reaction chamber) can lead to conditions favoring the formation of soot over CNMs, thus the introduction of carbonaceous material should be managed to avoid conditions favoring the formation of soot. Carbon or carbonaceous materials not used in the process or resulting from unused CNM product can be recycled as part of the carbon source in the CNM production process. The high-temperature reaction chambers operate at or below atmospheric pressures to enable stable plasma operation and are designed for high, continuous gas flow rates.

Reaction chamber sizes and designs depend on the desired residence times at specific temperatures and gas/solid flow and mixture. As discussed above, residence time is dependent on gas (material) flow rates, temperatures, and chamber volume (as a function of, e.g., chamber internal diameter and chamber length).

The secondary reaction chamber can be configured as an elongate, straight chamber (FIG. 6A) or as a serpentine design (FIG. 6B) and can be arranged horizontally or vertically to accommodate thermal growth and available facility space and services. See FIGS. 6A and 6B and the related discussion provided below for more details. As noted above, supplemental heating for the secondary reaction chamber can be employed to ensure that the temperatures in the secondary reaction chamber do not fall below a threshold value required to support the growth of CNMs. While the threshold value is a function of the catalyst employed, in general the threshold values vary from about 300° C. to over 500° C.

Table 1 (which is included below, near the end of the Description of the Preferred Embodiment) includes a listing of the components referenced in the Figures. As noted above, FIGS. 1-5 are process flow diagrams providing details for different embodiments that can be employed to produce CNMs using an ICP torch. Each process uses the ICP torch to produce free carbon from a carbonaceous stream, and to heat the free carbon and the catalytic metals to a required reaction temperature selected to enhance the formation of CNMs. The differences among the process flow diagrams in FIGS. 1-5 relate to the variation of the basic system, to achieve specific goals. Such goals include emphasizing the production of certain CNM types, qualities, and/or providing an overall method for direct integration of the raw CNMs into a CNM product ready for use, transportation, or further processing.

Each process (as shown in FIGS. 1-5) requires a number of individual process elements, including a high power source 3 (e.g., an RF power supply/oscillator) that feeds electric power 5 to one or more ICP torches 4, each of which is configured to direct a plasma jet into a primary reaction chamber 1. High temperature chemical reactions are initiated in the primary reaction chamber and maintained or altered as required in a secondary reaction chamber 2, which is in fluid communication with primary reaction chamber 1. Both primary reaction chamber 1 and secondary reaction chamber 2 are configured for in-flight production and growth of CNMs. Bulk process gas temperatures are selected and controlled between about 400° C. and about 1,300 C, but mostly above about 800° C. in primary reaction chamber 1, and between about 400° C. and about 1000 C, but mostly above about 500° C. in secondary reaction chamber 2.

Each reaction chamber is configured to support the in-flight production of CNMs. Preferably, the reaction chambers each include minimal baffles or obstructions, to enhance free flow within the reaction chambers. The walls of the reaction chambers should be smooth, to minimize the amount of free carbon or CNMs that will be deposited on the walls of the reaction chamber. Smooth chamber walls, combined with sufficiently high flow rates, will reduce the amount of CNMs dropping out of the gas flow due to deposition on the walls. The walls of the reaction chamber should not include any metals known to act as catalysts for the production of CNMs. Nickel alloyed in stainless steel has been shown to function as a catalyst that drives CNM growth, and stainless steel is therefore not a preferred material (unless coated with a non-metallic material). Non-metallic, smooth reaction chamber walls, such as achieved using quartz, glass, ceramics (or coatings of these materials) are thus preferred.

The size of the reaction chamber (as well as gas flow rates) will have an affect on residence time. The longer the residence time of the gas stream within the system, the longer (and larger) will be the CNMs produced. Thus, both reaction chamber size (and shape) and gas flow rates can be adjusted, based on the desired target size of the CNMs to be produced.

Each chamber is preferably maintained at or below atmospheric pressure. The purpose of using a negative pressure is to "pull" gas through the system, rather than "pushing" gas through the system. While either approach will work, using a sufficient amount of negative pressure to cause the desired gas flow through the system is more efficient. The purpose of using the negative pressure relates only to achieving desired flow rates, and not to a requirement that CNM formation occur at low pressure.

The process gas, including the entrained (and growing) in-flight CNM product, is preferably moved through the reaction system due to the negative pressure generated by an induced draft (ID) fan 40. The in-flight product is separated and/or altered in solids separation systems 50a-50d, each of which is described in greater detail below. Systems 50a-50d control solid/gas separation. System 50a is integrated into the process flow diagrams of FIGS. 1 and 5; system 50b is integrated into the process flow diagram of FIG. 2A; system 50c is integrated into the process flow diagram of FIG. 3; and, system 50d is integrated into the process flow diagram of FIG. 4.

Separated process gas 35 can be recycled in part or in full, back into the process, as indicated by a fluid line 37. The balance of process gas 36 is passed through ID fan 40, and if necessary to meet emission requirements, can be oxidized in an oxidation unit 42, cooled by a heat recovery unit 44, and filtered by a filter 46, prior to passing through an off gas stack 48 for exhaust to the atmosphere, as indicated by process arrow 49.

Process input streams include carbonaceous materials 8, catalytic metals 7, plasma gases 6, and if desired, additional process gases 9. Carbonaceous materials 8 can be in gaseous, liquid, slurry, and/or solid form, and can include hydrocarbon gases (e.g., $CH_4$, $C_2H_6$, or other $C_xH_y$'s), carbon monoxide, various carbonyls, carbon powder, and other materials streams that will be apparent as suitable for the process. Certain carbonaceous materials (e.g., carbon powder) collected in systems 50a-50d (i.e., non CNMs, or low value CNMs) may be recycled or added to carbonaceous materials 8 to enhance the formation of more desired CNMs in the process. A return/recycle stream 34 from systems 50a-50d including recycled carbonaceous materials 8a can be combined with carbonaceous materials 8 before being fed into the ICP torch (or into the ICP jet, or into the primary reactor), depending on the injection method selected.

Catalytic metals 7 can be in gaseous, liquid, slurry, and/or solid form and can include metals such as nickel, cobalt, iron, other Group VI or Group VII transition metals, and combinations thereof. Other metals, including metals from Group III and Group VIII have demonstrated catalytic activity promoting the growth of CNMs. Catalytic materials may be separated in systems 50a-50d and recycled as a stream 32 (as shown in FIGS. 3 and 4). Recycled metals (i.e., metals collected from within the system for reuse) can be combined with catalytic metals 7. As discussed above, metal catalysts can be introduced in the form of metal powders, metal salts, and solutions of metal salts or metal carbonyls.

Plasma gases can include pure gases or mixtures of argon, helium, and/or other inert gases, carbon monoxide, hydrogen, and other feed gases suitable for the operation of high-power ICP torch 4. A flow control valve 10 is used to control the input of plasma gas 6. Additional process gases 9 can include all listed plasma gases, as well as other materials suitable for enhancing the production of CNMs. Additional process gases 9 can be combined with recycled process gases 9a. The recycled process gases are supplied using a fluid line 37, a pump 38, and a check valve 39.

In process operation, carbonaceous materials 8 and recycled carbonaceous materials 8a are preferably fed via a flow control valve 16 into primary reaction chamber 1 at an entry point in the vicinity of a plasma jet 60 exiting each ICP torch 4. Optional or additional feed locations in the process system can be selectively activated using feed flow control valves 15, 17, 18, and 19, to enable, enhance, and/or increase the formation and growth of CNMs.

Catalytic metals 7 (including recycled metal catalysts, as desired) are preferably fed via control valves 11 and 12. Optional or additional feed locations in the process system can be selectively activated using feed flow control valves 13 and 14 to enable, enhance, and/or increase the formation and growth of CNMs.

Additional process gas materials 9 (and/or recycled process gases 9a) are preferably fed via a control valve 20. Optional or additional feed locations in the process system can be selectively activated using control valves 21, 22, 23, and 24 for increased process control and to enable, enhance, and/or increase the formation and growth of CNMs. Flow control valves 20, 22, and 23 can be temperature controlled to react to process temperatures measured at various locations in one or more of primary reaction chamber 1, secondary reaction chamber 2, a process stream 27 exiting primary reaction chamber 1, and a process stream 28 exiting secondary reaction chamber 2. Process heat for process temperature control (in addition to and independent of the primary process heat provided by ICP torch 4) can be selectively added to primary reaction chamber 1 and secondary reaction chamber 2 with supplemental heating devices 30 and 31.

It should be noted that the entire reaction chamber system can be designed to enable the extraction of various CNM products as a function of the in-flight duration, at various ports 33. This material may be further sorted, filtered, or treated as shown and described in conjunction with FIGS. 2A-5, providing more flexibility in the selection and production of a large variety of CNM product grades in the same overall process system.

The above discussion generally describes the processes and systems shown in FIGS. 1-5. Specific comments relating to the various embodiments of FIGS. 1-5 are provided below. Referring now to the main process configuration illustrated in FIG. 1, the process conditions are selected to promote continuous in-flight synthesis and growth of CNMs by keeping the precursors for CNM formation and growth entrained within the gas phase. The in-flight duration (residence time) of the growing particulate is determined and can be controlled and adjusted as a function of reaction chamber volume (e.g., diameter, length), total gas flow rates, reaction temperatures, temperature profiles, reaction chamber pressures, material introduction locations and orientations, and gas and materials flow patterns. In-flight durations (bulk gas residence times) of a few seconds to several minutes are possible. Multiple outlet ports 33 along the length of the primary and secondary reaction chambers enable extraction of product with various in-flight growth durations for sampling, process control, further treatment, and/or collection of commercial quantities of the product. In this manner, CNMs having various properties (e.g., different lengths and diameters) can be produced in a continuous operation. In the baseline configuration shown in FIG. 1, the CNM product is collected in solids separation system 50a, enabling the process to be operated without interruption (i.e., continuously). Sorting system 50a (solid/gas separation) includes a filtration system 51 (preferably including a plurality of individual filter elements), which provides an unsorted, untreated CNM product stream 52.

The separation of solid particulates from a gas flow is a mature art. While the small size of CNMs does pose a technical challenge, those of ordinary skill in the art will recognize that a plurality of different filtration systems can be employed to separate CNMs from a gas flow. Such filtration systems can be based on electrostatic charge, or pore-based filters (such as high-efficiency particulate arresting (HEPA) filters), and/or cascades or sprays of fluids. Such techniques are to be considered exemplary, and not limiting of the present invention. Preferred filtration systems will provide for recovery of the CNMs without the need to shut down the overall system (i.e., the ICP torch and the reaction chambers), thereby facilitating continuous processing, as opposed to batch processing. This goal can be achieved by providing a single filtration system, including multiple elements, or multiple filtration systems such that one system can be taken offline (to enable the recovery of the CNMs), while the other filtration system remains online.

Due to the varying sizes of the CNMs that will be produced, stage filters may be useful. Stage filters include multiple filter elements (or systems), such that particulates not captured by a "coarse" stage are subsequently captured by a later, "finer" stage. When sufficient size differences between the CNMs being produced exist, stage filters are useful because they enable some separation of CNMs by size. However, due to the small size of CNMs, stage filters are unlikely to be able to achieve a high degree of sorting.

Figure 1:
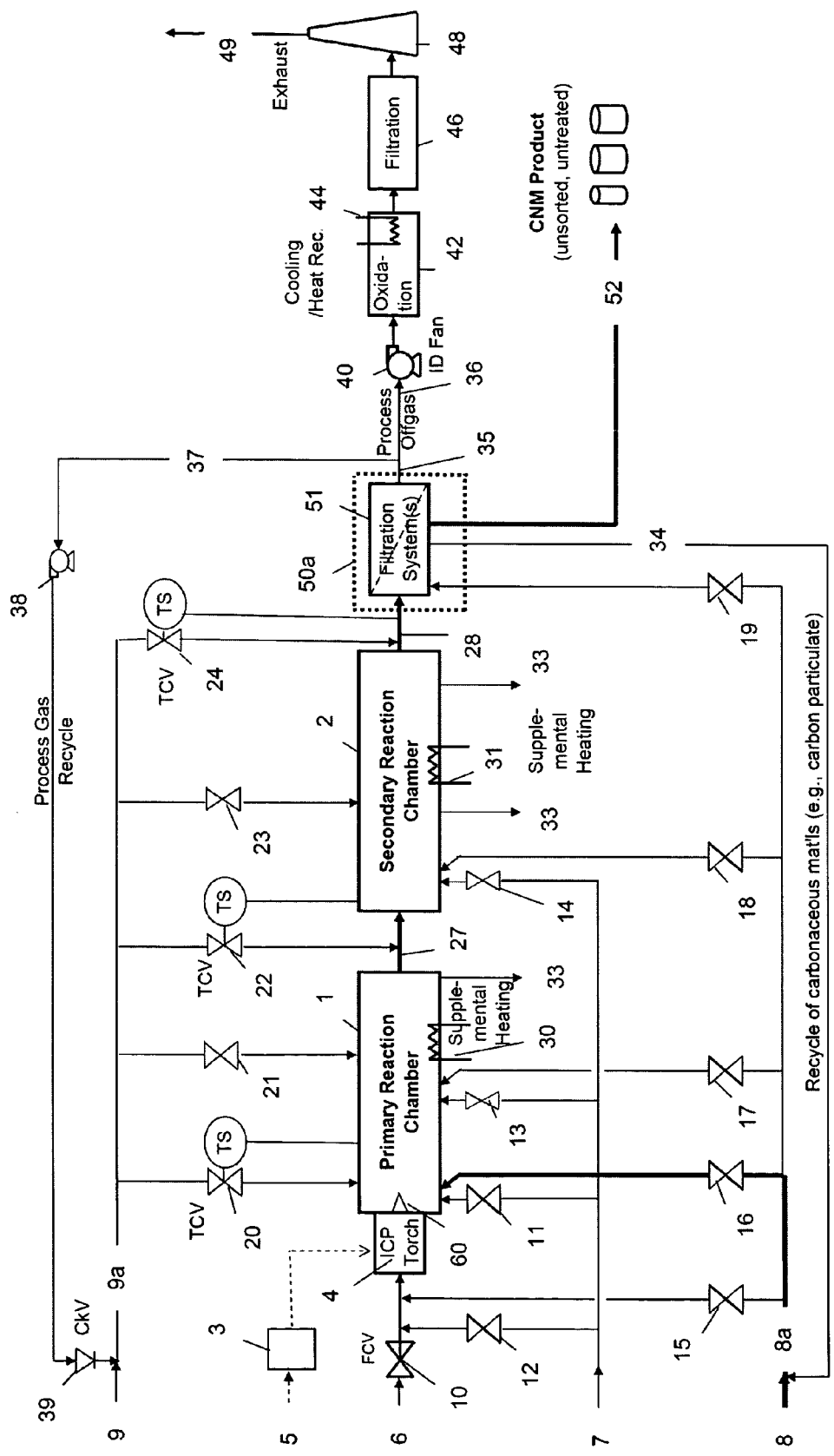
FIG. 1 is a process flow diagram for the in-flight production of CNMs using an ICP, in accord with the present invention.

Variations of the baseline configuration are shown in FIGS. 2A-5. Whereas FIG. 1 shows an embodiment in which the CNM product is untreated and unsorted, FIG. 2A illustrates a CNM process flow that produces an untreated, but sorted CNM product. CNM solids separation system 50b provides for the continuous, in-flight sorting or separation of CNM. Solids separation system 50b can be based on electrostatic, centrifugal, size distribution, or other separation principles, and can be directly applied prior to solid/gas separation in high-temperature or reduced temperature filtration mechanisms. Solids separation system 50b includes a CNM sorting system 56, and filtration systems 57, 58, and 59. CNM sorting system 56 enables the separation and sorting of the CNMs entrained in a main stream process stream 28 into various different CNM fractions based on selectable separation criteria and mechanisms. Centrifugal based processes are expected to be particularly useful. Astute readers will recognize that centrifugal force is a "fictitious" force, and that centrifuges actually work based on centripetal force. Thus, stream 28 will be separated into a plurality of different gas phase streams, each of which will be filtered in a designated filter system, such as filtration systems 57, 58, and 59. Preferably the number of filtration systems will correspond to the number of different streams provided by CNM sorting system 56. Each of filtration systems 57-59 can be implemented using the filters noted above. Since CNM sorter 56 has separated the gas flow into different streams based on particle sizes, each filter 57-59 can be implemented using a filtration system optimized for a specific size of particulate. Each filtration system will output its own specific CNM product (products 53, 54, and 55). CNM sorter 56 can also produce a flow of process gas, including carbonaceous matter to be reintroduced into the system, as indicated by process arrow 34a.

The sorting of nanoparticles of varying sizes into groups of nanoparticles of similar sizes is a growing field. As noted above, technologies based on a variety of different mechanisms are likely to be further developed. One technology that has been developed is referred to as a differential mobility analyzer (DMA). This technique has been employed by the Discovery Research Institute at the Wako Nanomaterial Processing Laboratory, as reported by Chief Scientist, Dr. Kazuo Takeuchizer (Riken News, Research Highlights, No. 253, Jul. 2002).

A DMA includes a pair of cylindrical electrodes (FIG. 2B). A stable vertical flow of a gas (i.e., a sheath gas) flows from top to bottom in the volume between the inner and outer cylinders. A sample of charged nanoparticles is released into the airflow and a voltage is applied between the cylinders. The nanoparticles are attracted to the inner cylinder as they are carried downward by the sheath gas. Because smaller particles move faster, they reach the inner cylinder at a higher point. A slit located on the inner cylinder allows particles of only a certain size range to exit through the slit. The size of the particles to be extracted can be controlled by varying the intensity of the applied electric voltage.

The DMA described above functions best at low pressures. While not specifically shown in the process flow diagram of FIG. 2A, it should be understood that CNM sorter 56 may require pressure reduction elements, as well as the DMA of FIG. 2B. It will also be appreciated that the DMA of FIG. 2B is merely exemplary of known techniques that can be employed to sort nanomaterials by size. Because additional techniques, which may be even more suitable for incorporation into the system of FIG. 2A, are currently under development, the invention is clearly not limited to the use of the DMA of FIG. 2B.

FIG. 3 integrates either unsorted or sorted CNMs into a final CNM product using solids separation system 50c, which includes CNM sorting system 56, one or more filtrations systems 57, and a product integration unit 61. System 50c in FIG. 3 presents a variation of system 50b of FIG. 2 in which either sorted CNMs 53 or unsorted CNMs 28a can be directly processed and/or upgraded in product integration unit 61, resulting in an integrated CNM product 65. Sorted CNMs 53 can be produced as described above, using CNM sorting system 56 with filtration systems 57-59. One implementation of product integration unit 61 comprises a liquid spray quench collection system, followed by filtration using a filter 62 to produce CNM product 65. Preferably, product 65 is upgraded so that it can be supplied for further processing, or ready for end usage, and/or be provided in a form suitable for safe and practical storage, transportation, and handling. An example of such a product is CNMs containing petrochemical liquids (e.g., carbon-enriched fuels) or chemicals used to manufacture various polymer components. Product integration unit 61 may require various chemical materials 63 to be input to achieve such value-added characteristics. Material exiting product integration unit 61 may be re-circulated back into product integration unit 61 for additional processing, e.g., to build up the concentration of CNMs to a desired level. Filter 62 provides both product 65, and a process emission stream 64.

The integration of CNMs into value-added products will be beneficial for handling, shipping, and transportation. Such products can be suitable for direct use in a follow-on process, and/or be ready for final use with enhanced product value. One application may involve production of CNM-containing petrochemical fuels for the increase of energy released in combustion engines. Another application may involve the capture of raw CNMs in a liquid solution or slurry for beneficial further processing in the production of conductive polymers or other composite materials. A specific gravity measurement system or other techniques known in the art of slurry production can be used to monitor and control the collection process. Parallel collection/holding tank systems can be used to provide continuous collection and isolation/product removal capabilities. Furthermore, the liquid used for the quench spray can perform post-production treatment of the CNM, by removal of the catalytic metal through leaching or dissolving the catalyst from the carbon structure. The catalytic metal(s) can then be recovered and recycled.

FIG. 4 shows the production of a thermally and/or chemically purified/upgraded CNM product, which can be either sorted or unsorted. This purification step can include the removal of catalytic metals through leaching or dissolving catalyst from the carbon structure. The catalytic metal(s) can then be recovered and recycled as described above. Solids separation system 50*d* combines the options for solids separation system 50*a* (FIG. 1) and solids separation system 50*b* (FIG. 2) with a chemical/thermal purification system 66 that ultimately generates either an unsorted or a sorted and purified CNM product. Purification can include the extraction of catalytic compounds 32 contained within untreated/unsorted CNMs 52 or sorted CNMs 53, and/or the select removal of unwanted forms of carbon 34*b*, such as amorphous carbon and polyhedral carbon particles. Purification system 66 may require various chemicals and/or process streams 68 (e.g., water, solvent, acid, oxygen, etc.) and/or heat 67. Extracted catalytic compounds 32 and rejected carbonaceous materials (unwanted carbon 34*b*) can be recycled into the main production process (i.e., injected into primary reaction chamber 1). Solids separation system 50*d* thus includes CNM sorting system 56, filtration systems 57, and a thermal/chemical purification unit 66, and can be used to produce a purified CNM product 69.

Oxidation techniques have also been reported to remove unwanted carbon material. For example, the "Temperature Programmed Oxidation Technique," reported by Krishnankutty, et. al., Catalysis Today, 37, 295 (1997) provides a method to treat CNMs through controlled oxidation at various temperatures. Amorphous carbon is removed under partial oxidation conditions at approximately 330° C. Such a method can be beneficially incorporated into the present invention to further process CNMs.

Note that the main process configuration (See FIG. 1) emphasizes the in-flight growth of CNMs, in contrast to conventional CNM production methods, which emphasize substrate-based production methods. A variation to the main process configuration of the present invention involves the combination of the in-flight growth and production process with vapor deposition of the ICP-produced carbon onto designated surfaces exposed to the in-flight growing product (i.e., the use of substrate-based CNM production). FIG. 5 demonstrates this concept of simultaneous in-flight CNM production with on-substrate CNM production. These substrate surfaces can be high-temperature filtration surfaces (with a mechanism of semi-continuous or periodic product removal) or other non-catalytic or catalytic surfaces either introduced into the reaction chamber as substrates or as an integral part of the reaction chamber (with periodic removal of product materials, for example, by controllably changing the flow of reactants between chambers to enable production to continue in one chamber while harvesting is done in another chamber). The catalytic surfaces could also be located in separate high-temperature chambers designated for on-substrate growth. These variations are likely to only be economically viable if the overall high production rates of the in-flight growth and production process is not significantly affected and if the additional on-surface/on-substrate growth product yields a high market value. One variation of the in-flight growth and production process is the minimization of in-flight duration, resulting primarily in on-surface/on-substrate growth, with just enough in-flight time to start the growth process of the free carbon.

Such a process requires modifications to the earlier described systems, and the incorporation of additional process equipment, generally as in system 80. The first group of modifications involves changes to secondary reaction chamber 2 (as shown in FIGS. 1-4) to achieve secondary reaction chamber 2*a* as shown in FIG. 5. Multiple ports 71 and 72 (additional ports can also be employed) are required to extract in-flight grown CNMs entrained in the process gas within secondary reaction chamber 2. The extracted process gas is directed into a CVD chamber 74, containing continuous or multiple individual substrates 77, each with catalytic metal (s). Chamber 74 can also be charged with CNM entrained process gas via ports 70 and 73 to provide the highest degree of process flexibility. Port 70 receives process gas exiting primary reaction chamber 1, which due to a relatively short residence time, is expected to include relatively shorter and smaller CNMs. In contrast, port 73 receives process gas exiting secondary reaction chamber 2*a*, which due to a relatively longer residence time, is expected to include relatively longer and larger CNMs.

Additional modifications to secondary reaction chamber 2*a* involve the integration of continuous or multiple individual substrates 75 (each with catalytic metal(s)) within the secondary reaction chamber. Thus, secondary reaction chamber 2*a* enables simultaneous on-substrate growth of CNMs (on substrates 75) and in-flight CNM growth (entrained within the process gas stream in the chamber) in a single equipment component. Production of CNMs on substrates 75 is continuous and ongoing, since process gas flows through the secondary reaction chamber whenever the overall system is running. In contrast, the feed inputs into CVD chamber 74 can be individually controlled, enabling CVD chamber 74 to produce CNMs in a batch-like process, by closing off the CVD chamber for product removal. Furthermore, ports 70, 71, 72 and 73 provide greater flexibility in the relative sizes of the CNMs entrained within the process gas inputs, which ultimately affects the types of CNMs produced on the substrates in CVD chamber 74 (because ports 70, 71, 72, and 73 receive process gas from different points in the continuous in-flight production of CNMs in the first and second primary reaction chambers). Substrate-based CNMs 76 from within secondary reaction chamber 2a can be combined with substrate based CNMs 78 from within CVD chamber 74 to achieve a combined substrate-based CNM product stream 79, in addition to untreated/unsorted CNMs 52 that are generated in-flight. Of course, combined substrate-based CNM product stream 79 can then be treated either in purification system 66 of FIG. 4, or in product integration unit 61 of FIG. 3. When beneficial or practical, carbonaceous materials 34c from secondary reaction chamber 2a and/or carbonaceous materials 34d from CVD chamber 74 can be introduced back into primary reaction chamber 1.

FIGS. 6A and 6B show two alternative optional secondary reaction chamber configurations. Uniform growth of in-flight CNMs requires laminar flow patterns achievable in long tubular reaction chambers 2b and 2c, having smooth, non-metal internal surfaces 85. The overall secondary reaction chamber can be formed either with straight (see chamber 2b in FIG. 6A) or serpentine-like elements (see chamber 2c in FIG. 6B), which can provide long in-flight durations of up to several minutes. Continuous or multiple individual supplemental heating elements 31a are preferred to evenly select, hold, and control the chamber temperature profile. Multiple ports 33a along the reaction chamber can be installed to permit extraction of in-flight CNMs for sampling and/or product extraction, or to introduce further process inputs.

All process equipment components for the ICP-driven CNM production processes in accord with the present invention are commercially available. However, the ICP torch systems described in commonly-assigned U.S. Pat. No. 5,611,947, entitled "Induction Steam Plasma Torch for Generating A Steam Plasma for Treating A Feed Slurry," and U.S. Pat. No. 6,153,852, entitled "Use of A Chemically Reactive Plasma for Thermal-Chemical Processes," are particularly useful. The disclosure and drawings of these two patents are hereby specifically incorporated herein by reference. Such ICP torches are capable of the high output power levels (up to 200 KW thermal energy) required to achieve commercially viable CNM production rates. These ICP torch systems can crack sufficient carbonaceous materials to produce as much as 100 to 150 metric tons of CNM per year (based on a single ICP system).

Unlike arc plasma systems, ICP technology-based systems do not contain any integral system parts that are consumed during operation. Compared to the ICP technology, electrodes consumed in arc plasma systems require more maintenance and can frequently require temporary process shutdowns, leading to lower overall on-line production times.

Testing Experience with CNM Production Using an ICP Production Process

FIG. 7 shows the layout of a test configuration used for a proof-of-concept demonstration of the ICP production process for producing CNMs. A 50 KW Lepel power supply/oscillator system 3' was used to provide high frequency (2-3 MHz) induction power to an ICP torch 4'. The ICP torch was mounted on top of a high-temperature primary reaction chamber 1', enabling a bulk gas temperature in excess of about 1,200° C. to be achieved. Plasma gases 6, such as argon (at 24% by volume in the empirical tests) and helium (at 76% by volume in the empirical tests), a carbonaceous feed gas 8 (methane in the empirical tests), and a cooling/quench gas 9' (helium in the empirical tests) were pressure-controlled and flow-regulated via control valves 10, 15, 16, and 20. Carbonaceous feed gas 8 was either introduced via ICP torch 4 and/or in the vicinity of the plasma jet and was rapidly heated by the plasma jet, resulting in free reactive carbon, hydrogen, and smaller amounts of lower hydro-carbonaceous gases.

In this simple test configuration, the process gas passes through primary reaction chamber 1', secondary reaction chamber 2', and a water-to-gas heat exchanger 44' at sub-atmospheric pressures provided by an induced draft fan 40', which is controlled by a control valve 25'. For safety purposes, a pressure relief system 41' and an automatic purge gas 9", with an energized-to-close control valve 21' were installed. An overall process control system and data acquisition system (not shown) employed BridgeView and FieldPoint instrumentation for monitoring and recording temperatures T1-T6, pressures P and DP, and other process parameters. On-substrate CNM growth was demonstrated by sample collection from several characterizing locations on catalytic metal (substrate) surfaces 75' that were placed within the each reaction chamber system 1' and 2'. Electron microscopy analysis, both TEM and SEM, verified CNM formation, including multi-wall carbon nanotubes, amorphous nanowires, and amorphous carbon.

Preparatory tests were conducted to establish new torch operating parameters for a He/Ar plasma. On-substrate production tests were conducted at bulk gas temperatures up to about 800° C., using $CH_4$ as the carbonaceous feed. Test operations were conducted at −20" water column pressure (i.e., slightly below atmospheric pressure), at power levels of 50 KW (plate). The catalytic material used in the experiments included surface substrate areas inside the primary and secondary reaction chamber.

In a limited number of tests conducted without gas-phase injection of catalyst materials, carbon deposits and growth were collected from substrate surfaces after reactor cooldown. Carbon samples were analyzed using SEM and TEM.

SEM and TEM scanning analysis confirmed that (primarily) nickel catalyst materials were extracted from (stainless steel) substrate reactor surfaces (and seen in the tip of CNMs, mainly in carbon nanowires). Overall, SEM and TEM imagery showed amorphous carbon nanowires, multi-wall carbon nanotubes, polyhedral carbon particulates, amorphous carbon nanoflakes, and other carbon forms. The MWCNTs were believed to have formed in flight and deposited on the walls of the process vessel.

FIGS. 8-15 are SEM or TEM images of products resulting from CNM production testing. FIG. 8 is a TEM image of a multi-wall carbon nanotubes grown on-substrate. FIG. 9 is a SEM image of what is believed to be multi-wall carbon nanotubes grown in-flight and collected on the front face of the process gas heat exchanger. Additional materials in the image are graphite flakes and polyhedral carbon particulates.

FIGS. 10-12 are SEM images of carbon nanowires grown on stainless steel reactor walls at temperatures of 700° C. The nickel from the stainless steel is seen on the tips of the nanowires in FIG. 12.

FIGS. 13-15 are SEM images showing additional CNMs grown on stainless steel sheet metal at temperatures of about 1,000° C. The carbon product was "peeled" from the sheet metal in 5-10 $cm^2$ patches. The SEM images reveal very long nanowires of 15-25 nm in diameter, along with carbon polyhedral particles and flakes. Accordingly, these images clearly indicate the success of these tests in efficiently forming CNMs.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

TABLE 1

COMPONENTS IN FIGURES

| No. | Explanation | Comment | Qualifier |
|---|---|---|---|
| 1 | Primary Rx Chamber | T = 400 to 1,300 C.; P = sub atm. to atm. | Equipment |
| 1' | Primary Rx Chamber | as used in empirical testing | Equipment |
| 2 | Secondary Rx Chamber | T = 400 to 1,300 C.; P = sub atm. to atm. | Equipment |
| 2" | Secondary Rx Chamber | as used in empirical testing | Equipment |
| 2a | Secondary Reaction Chamber (modified) | T = 400-1,300 C.; P = sub atm. to atm.; similar to 2, but w/catalytic substrates 75 | Equipment |
| 2b | Secondary Reaction Chamber | straight tubular design (horizontal or vertical, with or w/o external heating | Equipment |
| 2c | Secondary Reaction Chamber | serpentine-like, tubular design, horizontal or vertical, with or w/o external heating | Equipment |
| 3 | High Power Source | RF Power Supply/Oscillator; 50 kW and higher; one PS/OSC per ICP torch | Equipment |
| 3' | High Power Source | empirical testing unit [50 kW Lepel unit] | Equipment |
| 4 | ICP Torch | one or multiple units, mounted to Primary Reaction Chamber | Equipment |
| 4' | ICP Torch | empirical testing unit [TAFA model 66, modified] | Equipment |
| 5 | Electric Power | to 3 | Consumable |
| 6 | Plasma Gas Supply | Argon, Helium, other inert gases, CO, and/or $H_2$ | Materials Stream |
| 7 | Catalytic Metals | Gaseous, liquid, slurry, and/or solid Form | Materials Stream |
| 7a | Catalytic Metals (combined) | Sum of 7 and 32 | Materials Stream |
| 8 | Carbonaceous Materials (Feed) | Gaseous, liquid, slurry, and/or solid Form; $CH_4$, $C_2H_6$, other hydrocarbons ($C_xH_y$'s), CO, Carbon Powder, Carbonyls, etc. | Materials Stream |
| 8a | Carbonaceous Materials (combined Feed) | Sum of 8 and 34 and 34a | Materials Stream |
| 9 | Additional Process Streams | Argon, Helium, other inert gases, CO, and/or $H_2$ | Materials Stream |
| 9a | Additional Process Streams (combined) | combination of 9 and 37 | Materials Stream |
| 10 | Flow Control Valve | one or multiple valves controlling the flow rate for No. 6 | Control Component |
| 11 | Flow Control Valve | one or multiple valves controlling the flow rate for No. 7 entering in the vicinity of the plasma jet | Control Component |
| 12 | Flow Control Valve | one or multiple valves controlling the flow rate for No. 7 to 4 (optional) | Control Component |
| 13 | Flow Control Valve | one or multiple valves controlling the flow rate for No. 7 to 1 (optional) | Control Component |
| 14 | Flow Control Valve | one or multiple valves controlling the flow rate for No. 7 to 2 (optional) | Control Component |
| 15 | Flow Control Valve | one or multiple valves controlling the flow rate for No. 8 to 4 (optional) | Control Component |
| 16 | Flow Control Valve | one or multiple valves controlling the flow rate for No. 8 to 1 | Control Component |
| 17 | Flow Control Valve | one or multiple valves controlling the flow rate for No. 8 to 1 (optional) | Control Component |
| 18 | Flow Control Valve | one or multiple valves controlling the flow rate for No. 8 to 2 (optional) | Control Component |
| 19 | Flow Control Valve | one or multiple valves controlling the flow rate for No. 8 to System 50 (optional) | Control Component |
| 20 | Flow Control Valve | one or multiple (temperature regulated) valves controlling the flow rate for No. 9 to 1 (optional); | Control Component |
| 20' | Flow Control Valve | as used for empirical testing | Control Component |
| 21 | Flow Control Valve | one or multiple valves controlling the flow rate for No. 9 to 1 (optional) | Control Component |
| 21' | Flow Control Valve | as used for empirical testing | Control Component |
| 22 | Flow Control Valve | one or multiple (temperature regulated) valves controlling the flow rate for No. 9 to 2 (optional); | Control Component |
| 23 | Flow Control Valve | one or multiple valves controlling the flow rate for No. 9 to 2 (optional) | Control Component |

TABLE 1-continued

COMPONENTS IN FIGURES

| No. | Explanation | Comment | Qualifier |
|---|---|---|---|
| 24 | Flow Control Valve | one or multiple (temperature regulated) valves controlling the flow rate for No. 9 to 28 (optional); | Control Component |
| 25' | Flow Control Valve | as used in empirical testing | Control Component |
| 26 | Not used | N/A | N/A |
| 27 | Process Stream | leaving (1) and entering (2) | Process Stream |
| 28 | Process Stream | leaving 2 and entering 50 | Process Stream |
| 29 | Not used | N/A | N/A |
| 30 | Supplemental Heating | for 1 (optional) | Equipment |
| 30' | Supplemental Heating | as used in empirical testing | Equipment |
| 31 | Supplemental Heating | for 2 | Equipment |
| 31a | Supplemental Heating | for secondary reaction chamber; continuous or multiple individual sections | Equipment |
| 32 | Catalyst Recycle | optional, back to combine with 7 to 7a | |
| 33 | Outlet Ports | one or multiple outlet ports along 2 for sampling or product extraction | Equipment (Detail) |
| 33a | Outlet Ports | one or multiple outlet ports along secondary reaction chamber for sampling or product extraction | Equipment (Detail) |
| 34 | Carbon Recycle | from filtration system(s) 51, 57, 58, 58, etc.; to be added to 8, resulting in 8a | Materials Stream |
| 34a | Carbon Recycle | from CNM sorting system 56; to be added to 8, resulting in 8a | Materials Stream |
| 34b | Carbon Recycle | from CNM purification system 66; to be added to 8, resulting in 8a | Materials Stream |
| 34c | Carbon Recycle | from CNM purification system 2a; to be added to 8, resulting in 8a | Materials Stream |
| 34d | Carbon Recycle | from CNM purification system 74; to be added to 8, resulting in 8a | Materials Stream |
| 35 | Process Off gas | leaving system 50; cleaned of CNMs | Materials Stream |
| 36 | Process Off gas | Balance of stream 35 minus 37 | Materials Stream |
| 37 | Gas Recycle Stream | optional, leading to 38 | Materials Stream |
| 38 | Process Gas Recycle Pump | moves stream 38 | Equipment |
| 39 | Check Valve | supplied by 38 with 37, adding to 9 | Control Component |
| 40 | ID Fan | carrying stream 35 | Equipment |
| 40' | ID Fan | as used in empirical testing | Equipment |
| 41' | Pressure Relieve System | as used in empirical testing | Equipment |
| 42 | Oxidation Chamber | for residual combustibles in 35 | Equipment |
| 43 | Not used | N/A | N/A |
| 44 | Heat recovery system | for steam/other heat production (optional) | Equipment |
| 44' | Heat exchanger | as used in empirical testing | Equipment |
| 45 | Not used | N/A | N/A |
| 46 | Filtration | of entrained particulate (optional) | Equipment |
| 47 | Not used | N/A | N/A |
| 48 | Stack | for process exhaust 49 | Equipment |
| 48' | Stack | as used in empirical testing | Equipment |
| 49 | Process Exhaust | gas, mostly $CO_2$ and $H_2O$, no particulates | |
| 49' | Atmosphere | | |
| 50 | System 50 | Gas/solid separation and product delivery | Equipment (System) |
| 50a | System 50a | Separation system for Baseline concept in FIG. 1 (unsorted, untreated CNMs) | System |
| 50b | System 50b | Separation system for FIG. 2, for sorted, untreated CNM products | System |
| 50c | System 50c | Separation system for FIG. 3, for integrated (sorted/unsorted, untreated) CNM product | System |
| 50d | System 50d | Separation system (see FIG. 4), leading to sorted/unsorted and chemically/thermally treated CNM product | System |
| 51 | Filtration Systems | one or multiple units for collection of 52 | Equipment |
| 52 | CNM Product (unsorted/untreated) | unsorted and untreated In-flight CNM product; to be collected/stored | Product Stream |
| 53 | CNM Product Type 1 | sorted and untreated In-flight CNM Product; to be collected/stored | Product Stream |
| 54 | CNM Product Type 2 | sorted and untreated In-flight CNM Product; to be collected/stored | Product Stream |
| 55 | CNM Product Type 3 | sorted and untreated In-flight CNM Product; to be collected/stored | Product Stream |

TABLE 1-continued

COMPONENTS IN FIGURES

| No. | Explanation | Comment | Qualifier |
|---|---|---|---|
| 56 | CNM Sorting System | CNM Sorter based on centrifugal, sizing, or other sorting principles | Equipment |
| 57 | Filtration System 1 | one or multiple filter designed for collection of 53 | Equipment |
| 58 | Filtration System 2 | one or multiple filter designed for collection of 54 | Equipment |
| 59 | Filtration System 3 | one or multiple filter designed for collection of 55 | Equipment |
| 60 | Plasma Jet | at/near exit of (4), inside (1) | Materials Stream |
| 61 | Product Integration System | to integrate raw CNMs into a final CNM Product ready for direct usage, further processing, storage, or transportation. | System |
| 62 | Filtration/Separation | to separate or recirculate product or a process stream during operating cycle | Equipment |
| 63 | Chemicals | chemicals required for processing in 61 | Materials Stream |
| 64 | Emission Stream | from 62. optional: for materials recycle | Materials Stream |
| 65 | Integrated CNM Product | sorted or unsorted CNM product, possibly reacted in 61 | Product Stream |
| 66 | Chemical/Thermal Treatment | | Equipment/ Process |
| 67 | Heat Input | | Consumable |
| 68 | Process Chemicals | several, including liquids, solids, gases | Materials Stream |
| 69 | CNM Product (purified) | sorted or unsorted CNM product, purified (chemically/thermally treated) in 66 | Product Stream |
| 70 | In-flight CNM Stream | optional, partial to entire 27, contains in-flight CNMs | Process Stream |
| 71 | In-flight CNM Stream | optional, partial to entire stream within 2a, contains in-flight CNMs | Process Stream |
| 72 | In-flight CNM Stream | optional, partial to entire stream within 2a, contains in-flight CNMs; different location compared to 71 | Process Stream |
| 73 | In-flight CNM Stream | optional, partial to entire 81, contains in-flight CNMs | Process Stream |
| 74 | CVD Chamber | Chemical vapor deposition chamber including substrates w/catalytic metal(s) 77; T = 400 to 900 C.; P = sub atmospheric | Equipment |
| 75 | Substrate w/catalytic Metal(s) | single continuous or multiple substrates with catalytic metal(s) selected for CNM on-substrate growth in 2a | Equipment (Detail) |
| 76 | CNM Product Stream | On-substrate product stream from 2a; | Product Stream |
| 77 | Substrate w/catalytic Metal(s) | single continuous or multiple substrates with catalytic metal(s) selected for CNM on-substrate growth in 74 | Equipment (Detail) |
| 78 | CNM Product Stream | On-substrate product stream from 74; | Product Stream |
| 79 | CNM Product Stream | On-substrate product stream resulting from 76 and 78 | Product Stream |
| 80 | System 80 | System variation to combine in-flight CNM production (FIG. 1) with on-substrate CNM growth capability within 2 or external CVD chamber 74 | System |
| 81 | Process Stream | leaving (2a) | Process Stream |
| 82 | Process Stream | entering 50a; equals 81 reduced by 73 | Process Stream |
| 83 | Not used | N/A | N/A |
| 84 | Not used | N/A | N/A |
| 85 | Feature | Materials for internal reactor surfaces: quartz or other non-metal composition (for in-flight growth CNM production) | Equipment (Detail) |

The invention in which an exclusive right is claimed is defined by the following:

1. A method for producing carbon nanomaterials (CNMs) in a reactor using an inductively coupled plasma (ICP), comprising the steps of:
   (a) introducing the ICP into the reactor;
   (b) introducing a carbonaceous material into the reactor, such that the ICP heats and reacts with the carbonaceous material to produce free carbon;
   (c) introducing a catalyst into the reactor, the catalyst having been selected to enhance the production of CNMs from the free carbon in the reactor;
   (d) providing a secondary reaction chamber, the secondary reaction chamber providing additional residence time to promote the growth of longer CNMs;
   (e) using supplemental heat to maintain the temperature conditions in the secondary reaction chamber above a threshold value required to facilitate the additional growth of the CNMs; and
   (f) introducing additional carbonaceous materials into the secondary reaction chamber to provide carbon to facilitate the additional growth of the CNMs.

2. The method of claim 1, wherein:
   (a) the step of introducing the ICP into the reactor comprises the step of introducing the ICP into the reactor continuously for an extended period of time;
   (b) the step of introducing the carbonaceous material into the reactor comprises the step of introducing the carbonaceous material into the reactor continuously for an extended period of time; and
   (c) the step of introducing the catalyst into the reactor comprises the step of introducing the catalyst into the reactor continuously for an extended period of time.

3. The method of claim 1, wherein the step of introducing the ICP into the reactor comprises the step of establishing a gas flow within the reactor.

4. The method of claim 3, wherein the step of introducing the carbonaceous material into the reactor comprises the step of introducing the carbonaceous material into the gas flow.

5. The method of claim 3, wherein the step of introducing the catalyst into the reactor comprises the step of introducing the catalyst into the gas flow.

6. The method of claim 3, wherein:
   (a) the step of introducing the carbonaceous material into the reactor comprises the step of introducing the carbonaceous material into the gas flow; and
   (b) the step of introducing the catalyst into the reactor comprises the step of introducing the catalyst into the gas flow, such that the catalyst stimulates the production of CNMs within the gas flow in the reactor.

7. The method of claim 1, wherein the step of introducing the ICP into the reactor comprises the step of using an inert gas to generate the ICP.

8. The method of claim 7, wherein the step of using an inert gas to generate the ICP comprises the step of using an inert gas that includes only traces of nitrogen, to avoid generation of cyanide species.

9. The method of claim 7, wherein the inert gas comprises at least one of argon and helium.

10. The method of claim 9, wherein the inert gas comprises a mixture of argon and helium.

11. The method of claim 9, wherein the inert gas further comprises hydrogen in addition to at least one of argon and helium.

12. The method of claim 1, wherein the step of introducing the ICP into the reactor comprises the step of using a reactive gas to generate the ICP.

13. The method of claim 12, wherein the step of using a reactive gas to generate the ICP comprises the step of using carbon monoxide.

14. The method of claim 1, wherein the step of introducing the catalyst into the reactor comprises the step of introducing at least one of a metal powder, a metal salt, and a metal carbonyl into the reactor.

15. The method of claim 1, wherein the catalyst comprises at least one of: nickel, cobalt, iron, a Group III transition metal, a Group VI transition metal, a Group VII transition metal, and a Group VIII transition metal.

16. The method of claim 1, wherein the step of introducing the catalyst into the reactor comprises the step of introducing the catalyst into the reactor such that the production of single wall carbon nanotubes is favored.

17. The method of claim 1, wherein the step of introducing the catalyst into the reactor comprises the step of introducing the catalyst into the reactor such that the production of multi wall carbon nanotubes is favored.

18. The method of claim 1, further comprising the step of filtering a process gas exiting the reactor to recover the catalyst.

19. The method of claim 18, further comprising the step of recycling the catalyst by reintroducing the catalyst into the reactor.

20. The method of claim 1, further comprising the step of filtering a process gas exiting the reactor to recover the CNMs.

21. The method of claim 20, wherein the step of filtering the process gas exiting the reactor to recover the CNMs further comprises the step of sorting the CNMs by size.

22. The method of claim 21, wherein the step of sorting the CNMs by size comprises the step of using a differential mobility analyzer to sort the CNMs by size.

23. The method of claim 20, further comprising the step of incorporating the CNMs that are recovered into a product.

24. The method of claim 20, further comprising the step of purifying the CNMs that are recovered.

25. The method of claim 24, wherein the step of purifying the CNMs that are recovered comprises the step of separating the CNMs from the catalyst.

26. The method of claim 24, wherein the step of purifying the CNMs that are recovered comprises the step of separating the CNMs from less valuable carbon materials produced in the reactor.

27. The method of claim 1, further comprising the step of directing a process gas exiting the reactor into a secondary reactor.

28. The method of claim 1, further comprising the step of directing the gas flow over a substrate, such that CNMs are formed on the substrate.

29. The method of claim 1, wherein the reactor that does not include structures that would inhibit a free flow of gas within the reactor.

30. The method of claim 1, wherein internal surfaces of the reactor are substantially non metallic, such that a deposition of CNMs on the internal surfaces of the reactor is minimized.

31. The method of claim 1, wherein internal surfaces of the reactor are smooth.

32. The method of claim 1, wherein internal surfaces of the reactor comprise at least one of a glass, a ceramic, and quartz.

33. The method of claim 1, further comprising the step of establishing a negative pressure condition within the reactor, such that the gas flow is pulled through the reactor.

34. The method of claim 1, wherein the step of introducing the carbonaceous material into the reactor comprises the step of introducing the carbonaceous material into the reactor at more than one location, in order to prevent carbon concentrations in any one part of the reactor to favor the formation of soot.

35. A method for producing carbon nanomaterials (CNMs) using an inductively coupled plasma (ICP), comprising the steps of:
   (a) using an inert gas to generate the ICP;
   (b) using the ICP to establish a gas flow;
   (c) introducing a carbonaceous material into the gas flow, such that the ICP reacts with the carbonaceous material to produce free carbon;
   (d) introducing a catalyst into the gas flow, such that the catalyst stimulates the combination of free carbon to form CNMs within the gas flow; and
   (e) filtering the gas flow to remove CNMs entrained therein.

36. The method of claim 35, wherein the step of using an inert gas to generate the ICP comprises at least one of the steps of:
   (a) using an inert gas that includes only traces of nitrogen, to avoid generation of cyanide species;
   (b) using at least one of argon and helium for the inert gas;
   (c) using a mixture of argon and helium for the inert gas; and
   (d) using a mixture of at least one inert gas and hydrogen.

37. The method of claim 35, wherein the step of introducing the catalyst into the gas flow comprises the step of introducing at least one of: nickel, cobalt, iron, a Group III transition metal, a Group VI transition metal, a Group VII transition metal, and a Group VIII transition metal into the gas flow.

38. The method of claim 35, further comprising the step of filtering the gas flow to recover the catalyst.

39. The method of claim 35, wherein the step of filtering the gas flow to remove the CNMs further comprises the step of sorting the CNMs by size.

40. The method of claim 35, further comprising the step of purifying the CNMs using at least one of the steps of:
   (a) separating the CNMs from the catalyst; and
   (b) separating the CNMs from less valuable carbon materials produced in the gas flow.

41. The method of claim 35, further comprising the step of directing the gas flow over a substrate, such that CNMs are formed on the substrate.

42. The method of claim 35, wherein the step of introducing the catalyst into the gas flow comprises the step of introducing the catalyst into the gas flow such that the production of single wall carbon nanotubes is favored.

43. The method of claim 35, wherein the step of introducing the catalyst into the gas flow comprises the step of introducing the catalyst into the gas flow such that the production of multi wall carbon nanotubes is favored.

44. The method of claim 35, wherein the step of introducing the carbonaceous material into the gas flow comprises the step of introducing the carbonaceous material into the gas flow at more than one location, in order to prevent carbon concentrations in any one part of the gas flow to favor the formation of soot.

45. A method for producing carbon nanomaterials (CNMs) in a reactor using an inductively coupled plasma (ICP), comprising the steps of:
   (a) introducing the ICP into the reactor;
   (b) introducing a carbonaceous material into the reactor, such that the ICP heats and reacts with the carbonaceous material to produce free carbon;
   (c) introducing a catalyst into the reactor, the catalyst having been selected to enhance the production of CNMs from the free carbon in the reactor;
   (d) filtering a process gas exiting the reactor to recover the catalyst; and
   (e) recycling the catalyst by reintroducing the catalyst into the reactor.

46. A method for producing carbon nanomaterials (CNMs) in a reactor using an inductively coupled plasma (ICP), comprising the steps of:
   (a) using an inert gas to generate the ICP;
   (b) introducing the ICP into the reactor;
   (c) introducing a carbonaceous material into the reactor, such that the ICP heats and reacts with the carbonaceous material to produce free carbon; and
   (d) introducing a catalyst into the reactor, the catalyst having been selected to enhance the production of CNMs from the free carbon in the reactor.

* * * * *